United States Patent
Hiramoto et al.

(10) Patent No.: US 9,179,127 B2
(45) Date of Patent: Nov. 3, 2015

(54) THREE-DIMENSIONAL IMAGING DEVICE, IMAGING ELEMENT, LIGHT TRANSMISSIVE PORTION, AND IMAGE PROCESSING DEVICE

(75) Inventors: Masao Hiramoto, Osaka (JP); Yasunori Ishii, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 358 days.

(21) Appl. No.: 13/810,766

(22) PCT Filed: May 9, 2012

(86) PCT No.: PCT/JP2012/003027
§ 371 (c)(1),
(2), (4) Date: Jan. 17, 2013

(87) PCT Pub. No.: WO2012/157209
PCT Pub. Date: Nov. 22, 2012

(65) Prior Publication Data
US 2013/0120541 A1 May 16, 2013

(30) Foreign Application Priority Data
May 19, 2011 (JP) .................... 2011-112101

(51) Int. Cl.
H04N 13/02 (2006.01)
G03B 35/08 (2006.01)

(52) U.S. Cl.
CPC ............ H04N 13/0207 (2013.01); G03B 35/08 (2013.01); H04N 13/0214 (2013.01); H04N 13/0257 (2013.01)

(58) Field of Classification Search
CPC .......... H04N 13/0214; H04N 13/0207; H04N 13/0257; G03B 35/08
See application file for complete search history.

(56) References Cited

U.S. PATENT DOCUMENTS 6,807,295 B1  10/2004  Ono
2002/0171740 A1  11/2002  Seo
(Continued)

FOREIGN PATENT DOCUMENTS

CN   101076126 A   5/2007
CN   101427372 A   5/2009
(Continued)

OTHER PUBLICATIONS

International Search Report for corresponding International Application No. PCT/JP2012/003027 mailed Jul. 24, 2012.
(Continued)

*Primary Examiner* — Jefferey Harold
*Assistant Examiner* — Sean Haiem
(74) *Attorney, Agent, or Firm* — Renner, Otto, Boisselle & Sklar, LLP

(57) ABSTRACT

This 3D image capture device includes: a light transmitting section 1 with first and second light transmitting areas 1L and 1R; an image sensor 2a with a plurality of unit blocks; an imaging section 3; and an image processing section which generates multi-viewpoint images based on photoelectrically converted signals supplied from the image sensor 2a. If functions representing the respective spectral transmittances of the first light transmitting area 1L, the second light transmitting area 1R, a first type of pixel, and a second type of pixel with respect to the wavelength λ of visible radiation are identified by TL(λ), TR(λ), T1(λ), and T2(λ), respectively, TL(λ)≠TR(λ) and T1(λ)≠T2(λ) are satisfied, and each of TL(λ), TR(λ), T1(λ) and T2(λ) has at least one local maximum value and at least one local minimum value within each of red, green and blue wavelength ranges.

16 Claims, 11 Drawing Sheets

(56) References Cited

U.S. PATENT DOCUMENTS

| | | | |
|---|---|---|---|
| 2007/0102622 A1* | 5/2007 | Olsen et al. | 250/208.1 |
| 2007/0268377 A1 | 11/2007 | Nagano et al. | |
| 2009/0284627 A1 | 11/2009 | Bando et al. | |
| 2010/0066854 A1 | 3/2010 | Mather et al. | |
| 2011/0254985 A1* | 10/2011 | Hiramoto et al. | 348/294 |
| 2012/0133743 A1* | 5/2012 | Hiramoto et al. | 348/46 |

FOREIGN PATENT DOCUMENTS

| | | |
|---|---|---|
| JP | 62-217790 A | 9/1987 |
| JP | 62-291292 A | 12/1987 |
| JP | 02-171737 A | 7/1990 |
| JP | 2001-016611 A | 1/2001 |
| JP | 2002-344999 A | 11/2002 |
| JP | 2003-134533 A | 5/2003 |
| JP | 2009-276294 A | 11/2009 |
| JP | 2010-038788 A | 2/2010 |
| JP | 2010-079298 A | 4/2010 |
| WO | WO 2006/026354 A2 | 3/2006 |

OTHER PUBLICATIONS

Chinese Search report for corresponding Chinese Application No. 201280002061.0 (with English translation), dated Apr. 23, 2015.

* cited by examiner

THREE-DIMENSIONAL IMAGING DEVICE, IMAGING ELEMENT, LIGHT TRANSMISSIVE PORTION, AND IMAGE PROCESSING DEVICE

TECHNICAL FIELD

The present application relates to a single-lens 3D image capturing technology for generating multi-viewpoint images using a single optical system and a single image sensor.

BACKGROUND ART

Recently, the performance and functionality of digital cameras and digital movie cameras that use some solid-state image sensor such as a CCD and a CMOS (which will be sometimes simply referred to herein as an "image sensor") have been enhanced to an astonishing degree. In particular, the size of a pixel structure for use in a solid-state image sensor has been further reduced these days thanks to rapid development of semiconductor device processing technologies, thus getting an even greater number of pixels and drivers integrated together in a solid-state image sensor. As a result, the resolution of an image sensor has lately increased rapidly from around one million pixels to ten million or more pixels in a matter of few years. On top of that, the quality of an image captured has also been improved significantly as well. As for display devices, on the other hand, LCD and plasma displays with a reduced depth now provide high-resolution and high-contrast images, thus realizing high performance without taking up too much space. And such video quality improvement trends are now spreading from 2D images to 3D images. In fact, 3D display devices that achieve high image quality, although they require the viewer to wear a pair of polarization glasses, have been developed just recently.

As for the 3D image capturing technology, a typical 3D image capture device with a simple arrangement uses an image capturing system with two cameras to capture a right-eye image and a left-eye image. According to the so-called "two-lens image capturing" technique, however, two cameras need to be used, thus increasing not only the overall size of the image capture device but also the manufacturing cost as well. To overcome such a problem, methods for capturing multiple images with parallax (which will be sometimes referred to herein as "multi-viewpoint images") by using a single camera have been researched and developed.

For example, Patent Document No. 1 discloses a scheme that uses two polarizers, of which the transmission axes cross each other at right angles, and a rotating polarization filter. FIG. 13 is a schematic representation illustrating an arrangement for an image capturing system that adopts such a scheme. This image capture device includes a 0-degree-polarization polarizer 11, a 90-degree-polarization polarizer 12, a reflective mirror 13, a half mirror 14, a circular polarization filter 15, a driver 16 that rotates the circular polarization filter 15, an optical lens 3, and an image capture device 9 for capturing the image that has been produced by the optical lens. In this arrangement, the half mirror 14 reflects the light that has been transmitted through the polarizer 11 and then reflected from the reflective mirror 13 but transmits the light that has been transmitted through the polarizer 12. With such an arrangement, the light beams that have been transmitted through the two polarizers 11 and 12, which are arranged at two different positions, pass through the half mirror 14, the circular polarization filter 15 and the optical lens 3 and then enter the image capture device 9, where an image is captured. The image capturing principle of this scheme is that two images with parallax are captured by rotating the circular polarization filter 15 so that the light beams that have been incident on the two polarizers 11 and 12 are imaged at mutually different times.

According to such a scheme, however, images at mutually different positions are captured time-sequentially by rotating the circular polarization filter 15, and therefore, two images with parallax cannot be captured at the same time, which is a problem. In addition, the durability of such a system is also a question mark because the system uses mechanical driving. On top of that, since the incoming light passes through the polarizers 11, 12 and the polarization filter 15, the quantity of the light received eventually by the image capture device 9 decreases by as much as 50%, which is non-negligible, either.

To overcome these problems, Patent Document No. 2 discloses a scheme for capturing two images with parallax at the same time without using such mechanical driving. An image capture device that adopts such a scheme gets the two incoming light beams, which have come from two different directions, condensed by a reflective mirror, and then received by an image sensor in which two different kinds of polarization filters are arranged alternately, thereby capturing two images with parallax without using a mechanical driving section.

FIG. 14 is a schematic representation illustrating an arrangement for an image capturing system that adopts such a scheme. This image capturing system includes two polarizers 11 and 12, of which the transmission axes are arranged to cross each other at right angles, reflective mirrors 13, an optical lens 3, and an image sensor 2. On its imaging area, the image sensor 2 has a number of pixels 10 and polarization filters 17 and 18, each of which is provided one to one for an associated one of the pixels. Those polarization filters 17 and 18 are arranged alternately over all of those pixels. In this case, the transmission axis directions of the polarization filters 17 and 18 agree with those of the polarizers 11 and 12, respectively.

With such an arrangement, the incoming light beams are transmitted through the polarizers 11 and 12, reflected from the reflective mirrors 13, passed through the optical lens 3 and then incident on the imaging area of the image sensor 1. Those light beams to be transmitted through the polarizers 11 and 12, respectively, and then incident on the image sensor 1 are transmitted through the polarization filters 17 and 18 and then photoelectrically converted by the pixels that are located right under those polarization filters 17 and 18. If the images to be produced by those light beams that have been transmitted through the polarizers 11 and 12 and then incident on the image sensor 1 are called a "right-eye image" and a "left-eye image", respectively, then the right-eye image and the left-eye images are generated by a group of pixels that face the polarization filters 17 and a group of pixels that face the polarization filter 18, respectively.

As can be seen, according to the scheme disclosed in Patent Document No. 2, two kinds of polarization filters, of which the transmission axes are arranged so as to cross each other at right angles, are arranged alternately over the pixels of the image sensor, instead of using the circular polarization filter disclosed in Patent Document No. 1. As a result, although the resolution decreases to a half compared to the method of Patent Document No. 1, a right-eye image and a left-eye image with parallax can be obtained at the same time by using a single image sensor. According to such a technique, however, the incoming light has its quantity decreased considerably when being transmitted through the polarizers and the polarization filters, and therefore, the quantity of the light received by the image sensor decreases as significantly as in Patent Document No. 1.

To cope with such a problem of the decreased quantity of light received by the image sensor, Patent Document No. 3 discloses a technique for obtaining two images with parallax and a normal image with a single image sensor. According to such a technique, those two images with parallax and the normal image can be obtained by a single image sensor by changing mechanically some components that have been used to capture two images with parallax with alternative components for use to capture a normal image, and vice versa. When two images with parallax are going to be obtained, two polarization filters are arranged on the optical path as disclosed in Patent Document No. 2. On the other hand, when a normal image is going to be obtained, those polarization filters are mechanically removed from the optical path. By introducing such a mechanism, those images with parallax and a normal image that uses the incoming light highly efficiently can be obtained.

Although a polarizer or a polarization filter is used according to the techniques disclosed in Patent Document Nos. 1 to 3, color filters may also be used according to another approach. For example, Patent Document No. 4 discloses a technique for obtaining two images with parallax at the same time using color filters. FIG. 15 schematically illustrates an image capturing system disclosed in Patent Document No. 4. The image capturing system includes a lens 3, a lens diaphragm 19, a light beam confining plate 20 with two color filters 20a and 20b that have mutually different transmission wavelength ranges, and a photosensitive film 21. In this case, the color filters 20a and 20b may be filters that transmit red- and blue-based light rays, respectively.

In such an arrangement, the incoming light passes through the lens 3, the lens diaphragm 19 and the light beam confining plate 20 and produces an image on the photosensitive film. In the meantime, only red- and blue-based light rays are respectively transmitted through the two color filters 20a and 20b of the light beam confining plate 20. As a result, a magenta-based color image is produced on the photosensitive film by the light rays that have been transmitted through the two color filters. In this case, since the color filters 20a and 20b are arranged at mutually different positions, the image produced on the photosensitive film comes to have parallax. Thus, if a photograph is developed with the photosensitive film and viewed with a pair of glasses, in which red and blue films are attached to its right- and left-eye lenses, the viewer can view an image with depth. In this manner, according to the technique disclosed in Patent Document No. 4, multi-viewpoint images can be produced using the two color filters.

According to the technique disclosed in Patent Document No. 4, the light rays are imaged on the photosensitive film, thereby producing images with parallax there. Meanwhile, Patent Document No. 5 discloses a technique for producing images with parallax by transforming incoming light into electrical signals. FIG. 16 schematically illustrates a light beam confining plate according to Patent Document No. 5. According to such a technique, a light beam confining plate 22, which has a red ray transmitting R area 22R, a green ray transmitting G area 22G and a blue ray transmitting B area 22B, is arranged on a plane that intersects with the optical axis of the imaging optical system at right angles. And by getting the light rays that have been transmitted through those areas received by a color image sensor that has red-, green- and blue-ray-receiving R, G and B pixels, an image is generated based on the light rays that have been transmitted through those areas.

Patent Document No. 6 also discloses a technique for obtaining images with parallax using a similar configuration to the one used in Patent Document No. 5. FIG. 17 schematically illustrates a light beam confining plate as disclosed in Patent Document No. 6. According to that technique, by making the incoming light pass through R, G and B areas 23R, 23G and 23B of the light beam confining plate 23, images with parallax can also be produced.

Patent Document No. 7 also discloses a technique for generating multiple images with parallax using a pair of filters with mutually different colors, which are arranged symmetrically to each other with respect to an optical axis. By using red and blue filters as the pair of filters, an R pixel that senses a red ray observes the light that has been transmitted through the red filter, while a B pixel that senses a blue ray observes the light that has been transmitted through the blue filter. Since the red and blue filters are arranged at two different positions, the light received by the R pixel and the light received by the B pixel have come from mutually different directions. Consequently, the image observed by the R pixel and the image observed by the B pixel are ones viewed from two different viewpoints. By defining corresponding points between those images on a pixel-by-pixel basis, the magnitude of parallax can be calculated. And based on the magnitude of parallax calculated and information about the focal length of the camera, the distance from the camera to the subject can be obtained.

Patent Document No. 8 discloses a technique for obtaining information about a subject distance based on two images that have been generated using either a diaphragm to which two color filters with mutually different aperture sizes (e.g., red and blue color filters) are attached or a diaphragm to which two color filters in two different colors are attached horizontally symmetrically with respect to the optical axis. According to such a technique, if light rays that have been transmitted through the red and blue color filters with mutually different aperture sizes are observed, the degrees of blur observed vary from one color to another. That is why the degrees of blur of the two images that are associated with the red and blue color filters vary according to the subject distance. By defining corresponding points with respect to those images and comparing their degrees of blur to each other, information about the distance from the camera to the subject can be obtained. On the other hand, if light rays that have been transmitted through two color filters in two different colors that are attached horizontally symmetrically with respect to the optical axis are observed, the direction from which the light observed has come changes from one color to another. As a result, two images that are associated with the red and blue color filters become images with parallax. And by defining corresponding points with respect to those images and calculating the distance between those corresponding points, information about the distance from the camera to the subject can be obtained.

According to the techniques disclosed in Patent Documents Nos. 4 to 8 mentioned above, images with parallax can be produced by arranging RGB color filters on a light beam confining plate. However, since a light beam confining plate is used, the percentage of the incoming light that can be used decreases significantly. In addition, to increase the effect of parallax, those RGB color filters should be arranged at distant positions and should have decreased areas. In that case, however, the percentage of the incoming light that can be used further decreases.

Unlike these techniques, Patent Document No. 9 discloses a technique for obtaining multiple images with parallax and a normal image that is free from the light quantity problem by using a diaphragm in which RGB color filters are arranged. According to that technique, when the diaphragm is closed, only the light rays that have been transmitted through the RGB color filters are received. On the other hand, when the diaphragm is opened, the RGB color filter areas are outside of the optical path, and therefore, the incoming light can be received entirely. Consequently, images with parallax can be obtained when the diaphragm is closed and a normal image that uses the incoming light highly efficiently can be obtained when the diaphragm is opened.

CITATION LIST

Patent Literature

Patent Document No. 1: Japanese Laid-Open Patent Publication No. 62-291292
Patent Document No. 2: Japanese Laid-Open Patent Publication No. 62-217790
Patent Document No. 3: Japanese Laid-Open Patent Publication No. 2001-016611
Patent Document No. 4: Japanese Laid-Open Patent Publication No. 2-171737
Patent Document No. 5: Japanese Laid-Open Patent Publication. No. 2002-344999
Patent Document No. 6: Japanese Laid-Open Patent Publication No. 2009-276294
Patent Document No. 7: Japanese Laid-Open Patent Publication No. 2010-38788
Patent Document No. 8: Japanese Laid-Open Patent Publication No. 2010-79298
Patent Document No. 9: Japanese Laid-Open Patent Publication No. 2003-134533

SUMMARY OF INVENTION

Technical Problem

According to any of these techniques of the related art, multi-viewpoint images can be certainly generated, but the quantity of the light received by the image sensor is smaller than usual because a polarizer or color filters are used. In order to receive a sufficient quantity of incoming light, some mechanism that removes the polarizing portion or color filter areas from the optical path needs to be used. That is to say, according to none of these techniques of the related art, multi-viewpoint images and an image that uses the incoming light highly efficiently can be obtained at the same time without using such a mechanism.

An embodiment of the present invention provides an image capturing technique by which multi-viewpoint images that use incoming light highly efficiently can be obtained without using such mechanical driving.

Solution to Problem

To overcome these problems, a 3D image capture device as an embodiment of the present invention includes: a light transmitting section with first and second light transmitting areas; an image sensor which is arranged to receive light that has been transmitted through the light transmitting section and which has an imaging area where a plurality of unit blocks, each including a first type of pixel and a second type of pixel, are arranged; an imaging section which produces an image on the imaging area of the image sensor; and an image processing section which generates multi-viewpoint images based on photoelectrically converted signals supplied from the first and second types of pixels. If functions representing the respective spectral transmittances of the first light transmitting area, the second light transmitting area, the first type of pixel, and the second type of pixel with respect to the wavelength λ of visible radiation are identified by TL(λ), TR(λ), T1(λ), and T2(λ), respectively, TL(λ)≠TR(λ) and T1(λ)≠T2(λ) are satisfied, and each of TL(λ), TR(λ), T1(λ) and T2(λ) has at least one local maximum value and at least one local minimum value within each of red, green and blue wavelength ranges.

An image sensor as an embodiment of the present invention is used in the 3D image capture device described above.

A light transmitting section as an embodiment of the present invention is used in the 3D image capture device described above.

An image processor as an embodiment of the present invention generates an image based on a signal supplied from a 3D image capture device. The device includes: a light transmitting section with first and second light transmitting areas; an image sensor which is arranged to receive light that has been transmitted through the light transmitting section and which has an imaging area where a plurality of unit blocks, each including a first type of pixel and a second type of pixel, are arranged; and an imaging section which produces an image on the imaging area of the image sensor. If functions representing the respective spectral transmittances of the first light transmitting area, the second light transmitting area, the first type of pixel, and the second type of pixel with respect to the wavelength λ of visible radiation are identified by TL(λ), TR(λ), T1(λ), and T2(λ), respectively, TL(λ)≠TR(λ) and T1(λ)≠T2(λ) are satisfied, and each of TL(λ), TR(λ), T1(λ) and T2(λ) has at least one local maximum value and at least one local minimum value within each of red, green and blue wavelength ranges. The image processor generates multi-viewpoint images based on photoelectrically converted signals supplied from the first and second types of pixels.

These general and particular embodiments can be implemented as a system, a method, a computer program or a combination thereof.

Advantageous Effects of Invention

According to an embodiment of the present invention, by using a light transmitting section with a light transmitting area that has a higher transmittance than an ordinary color filter, multi-viewpoint images can be generated with the incoming light used highly efficiently.

DESCRIPTION OF EMBODIMENTS

Figure 1:
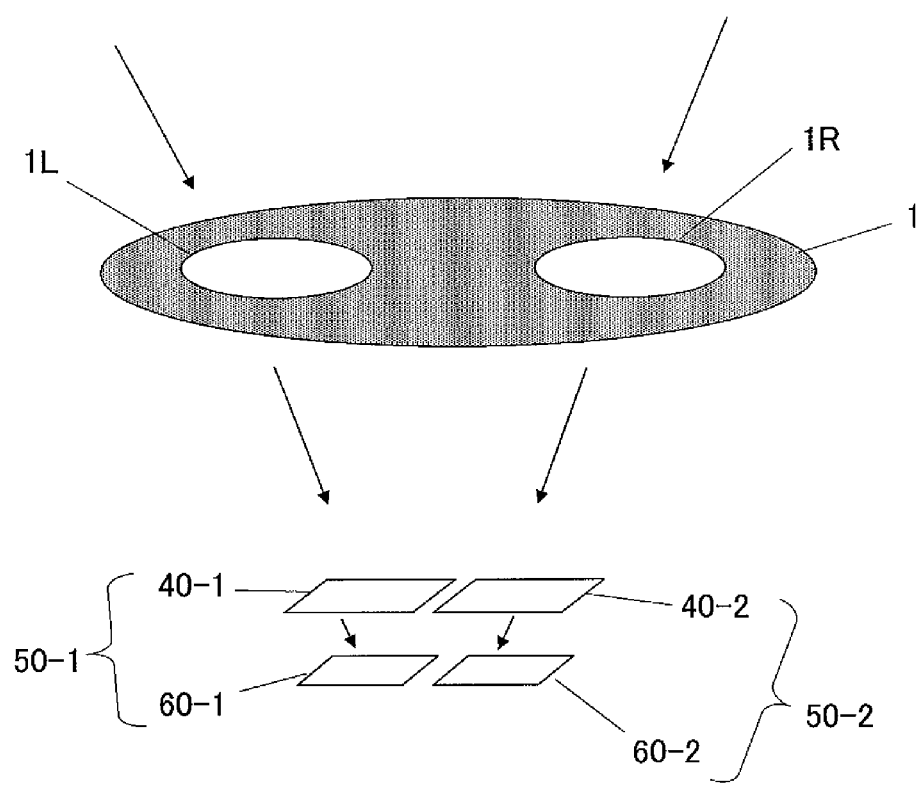
FIG. 1 Schematically illustrates an example of a unit block consisting of a light transmitting section and an image sensor.

Exemplary embodiments of the present invention are outlined as follows:

(1) A 3D image capture device as an embodiment of the present invention includes: a light transmitting section with first and second light transmitting areas; an image sensor which is arranged to receive light that has been transmitted through the light transmitting section and which has an imaging area where a plurality of unit blocks, each including a first type of pixel and a second type of pixel, are arranged; an imaging section which produces an image on the imaging area of the image sensor; and an image processing section which generates multi-viewpoint images based on photoelectrically converted signals supplied from the first and second types of pixels. If functions representing the respective spectral transmittances of the first light transmitting area, the second light transmitting area, the first type of pixel, and the second type of pixel with respect to the wavelength $\lambda$ of visible radiation are identified by $TL(\lambda)$, $TR(\lambda)$, $T1(\lambda)$, and $T2(\lambda)$, respectively, $TL(\lambda) \neq TR(\lambda)$ and $T1(\lambda) \neq T2(\lambda)$ are satisfied, and each of $TL(\lambda)$, $TR(\lambda)$, $T1(\lambda)$ and $T2(\lambda)$ has at least one local maximum value and at least one local minimum value within each of red, green and blue wavelength ranges.

(2) In one embodiment, $TL(\lambda)=T1(\lambda)$ and $TR(\lambda)=T2(\lambda)$ are satisfied.

(3) In one embodiment of the 3D image capture device of (2), $TL(\lambda)$, $TR(\lambda)$, $T1(\lambda)$ and $T2(\lambda)$ are periodic functions.

(4) In one embodiment of the 3D image capture device of one of (1) to (3), the first type of pixel includes a first photosensitive cell and a first transmitting filter which is arranged so as to face the first photosensitive cell. The second type of pixel includes a second photosensitive cell and a second transmitting filter which is arranged so as to face the second photosensitive cell. $T1(\lambda)$ is a function representing the spectral transmittance of the first transmitting filter. And $T2(\lambda)$ is a function representing the spectral transmittance of the second transmitting filter:

(5) In one embodiment of the 3D image capture device of (4), each unit block further includes a third type of pixel and a fourth type of pixel. The third type of pixel includes a third photosensitive cell and a third transmitting filter which is arranged to face the third photosensitive cell and which selectively transmits a light ray with a first color component. The fourth type of pixel includes a fourth photosensitive cell and a fourth transmitting filter which is arranged to face the fourth photosensitive cell and which selectively transmits a light ray with a second color component. The image processing section generates color information based on photoelectrically converted signals supplied from the third and fourth types of pixels.

(6) In one embodiment of the 3D image capture device of one of (1) to (3), the first type of pixel includes a plurality of photosensitive cells and a plurality of transmitting filters, each of which is arranged so as to face an associated one of the photosensitive cells and which have mutually different spectral transmittance characteristics. The second type of pixel includes a single photosensitive cell and a single transmitting filter which is arranged so as to face the single photosensitive cell. $TL(\lambda)$ is a function representing the sum of the spectral transmittances of the transmitting filters included in the first type of pixel. And $T2(\lambda)$ is a function representing the spectral transmittance of the single transmitting filter included in the second type of pixel.

(7) In one embodiment of the 3D image capture device of (6), the transmitting filters included in the first type of pixel are configured to selectively transmit light rays with mutually different color components.

(8) In one embodiment of the 3D image capture device of (7), the number of photosensitive cells and the number of transmitting filters included in the first type of pixel are both three. First, second and third ones of those three transmitting filters are configured to selectively transmit a light ray with a color red component, a light ray with a color green component, and a light ray with a color blue component, respectively.

(9) In one embodiment of the 3D image capture device of one of (1) to (3), the first type of pixel includes a plurality of photosensitive cells and a plurality of transmitting filters, each of which is arranged so as to face an associated one of the photosensitive cells and which have mutually different spectral transmittance characteristics. The second type of pixel includes a plurality of photosensitive cells and a plurality of transmitting filters, each of which is arranged so as to face an associated one of the photosensitive cells and which have mutually different spectral transmittance characteristics. $T1(\lambda)$ is a function representing the sum of the spectral transmittances of the transmitting filters included in the first type of pixel. And $T2(\lambda)$ is a function representing the sum of the spectral transmittances of the transmitting filters included in the second type of pixel.

(10) In one embodiment of the 3D image capture device of (9), each of the first and second types of pixels includes first through $N^{th}$ (where N is an integer that is equal to or greater than three) photosensitive cells and first through $N^{th}$ transmitting filters, each of which is arranged so as to face an associated one of the first through $N^{th}$ photosensitive cells. The first through $N^{th}$ transmitting filters included in the first type of pixel are configured to selectively transmit light rays with first through $N^{th}$ color components, respectively. The first through $N^{th}$ transmitting filters included in the second type of pixel are configured to selectively transmit light rays with the first through $N^{th}$ color components, respectively. And the spectral transmittance characteristic of an $i^{th}$ (where i is an integer that falls within the range of one through N) transmitting filter, included in the first type of pixel, with respect to the $i^{th}$ color component is different from that of an $i^{th}$ transmitting filter, included in the second type of pixel, with respect to the $i^{th}$ color component.

(11) In one embodiment of the 3D image capture device of (10), N=3, and the first through third color components are red, green and blue components, respectively.

(12) In one embodiment of the 3D image capture device of one of (1) to (11), the image processing section generates color multi-viewpoint images based on the signals supplied from the first and second types of pixels.

(13) In one embodiment of the 3D image capture device of one of (1) to (12), the device further includes a storage section which stores an output signal of the image sensor, and the image processing section generates the multi-viewpoint images based on the signal that is stored in the storage section.

(14) An image sensor as an embodiment of the present invention is used in the 3D image capture device of one of (1) to (13).

(15) A light transmitting section as an embodiment of the present invention is used in the 3D image capture device of one of (1) to (13).

(16) An image processor as an embodiment of the present invention generates an image based on a signal supplied from a 3D image capture device. The device includes: a light transmitting section with first and second light transmitting areas; an image sensor which is arranged to receive light that has been transmitted through the light transmitting section and which has an imaging area where a plurality of unit blocks, each including a first type of pixel and a second type of pixel, are arranged; and an imaging section which produces an image on the imaging area of the image sensor. If functions representing the respective spectral transmittances of the first light transmitting area, the second light transmitting area, the first type of pixel, and the second type of pixel with respect to the wavelength $\lambda$ of visible radiation are identified by $TL(\lambda)$, $TR(\lambda)$, $T1(\lambda)$, and $T2(\lambda)$, respectively, $TL(\lambda) \neq TR(\lambda)$ and $T1(\lambda) \neq T2(\lambda)$ are satisfied, and each of $TL(\lambda)$, $TR(\lambda)$, $T1(\lambda)$ and $T2(\lambda)$ has at least one local maximum value and at least one local minimum value within each of red, green and blue wavelength ranges. The image processor generates multi-viewpoint images based on photoelectrically converted signals supplied from the first and second types of pixels.

Before specific embodiments of the present invention are described, first of all, the basic principle of an embodiment of the present invention will be described briefly. In the following description, a signal or information representing an image will be sometimes referred to herein as just an "image".

A 3D image capture device as an embodiment of the present invention (which will be simply referred to herein as an "image capture device") includes a light transmitting section with two light transmitting areas, an image sensor which has an imaging area where a plurality of unit blocks, each including at least two kinds of pixels, are arranged, an imaging section which produces an image on the imaging area of the image sensor, and an image processing section which generates multi-viewpoint images based on the output signal of the image sensor.

FIG. 1 schematically illustrates an exemplary arrangement of the light transmitting section 1 and two pixels 50-1, 50-2, which are included in a single unit block of the image sensor, in the image capture device. Illustration of the imaging section and other components is omitted in FIG. 1. In the exemplary configuration shown in FIG. 1, the pixel 50-1 includes a photosensitive cell 60-1 and a transmitting filter 40-1 which is arranged closer to the light source so as to face the photosensitive cell 60-1. Likewise, the other pixel 50-2 also includes a photosensitive cell 60-2 and a transmitting filter 40-2 which is arranged closer to the light source so as to face the photosensitive cell 60-2. In this manner, such a combination of a single photosensitive cell and a single transmitting filter which is arranged so as to face the photosensitive cell will be referred to herein as a "pixel".

The light transmitting section 1 shown in FIG. 1 has two light transmitting areas 1L and 1R, of which the transmittances have mutually different wavelength dependences (which will be referred to herein as "spectral transmittances") and which are not completely transparent but have the property of transmitting a light ray falling within any of the red (R), green (G) and blue (B) wavelength ranges (i.e., a light ray representing any of these color components).

The two photosensitive cells 60-1 and 60-2 each receive the incident light and output an electrical signal representing the intensity of the light received (which will be referred to herein as a "photoelectrically converted signal" or a "pixel signal"). The transmitting filters 40-1 and 40-2 that face the photosensitive cells 60-1 and 60-2, respectively, have the property of cutting the incoming light partially. The transmitting filters 40-1 and 40-2 also have mutually different spectral transmittance characteristics, are not completely transparent, but have the property of transmitting a light ray falling within any of the red (R), green (G) and blue (B) wavelength ranges.

Figure 2A:
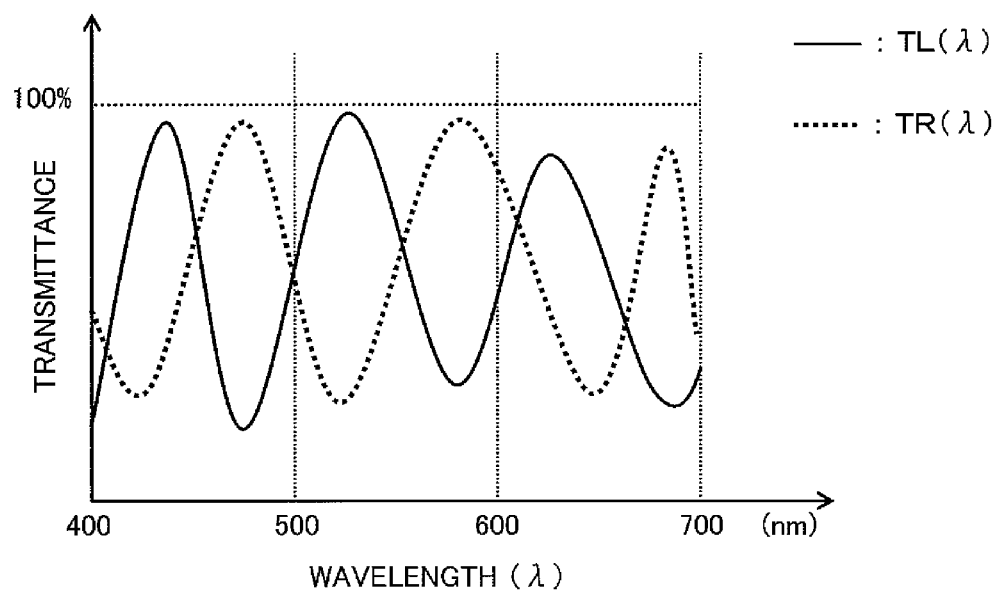
FIG. 2A A graph showing exemplary spectral transmittance characteristics of two light transmitting areas.
Figure 2B:
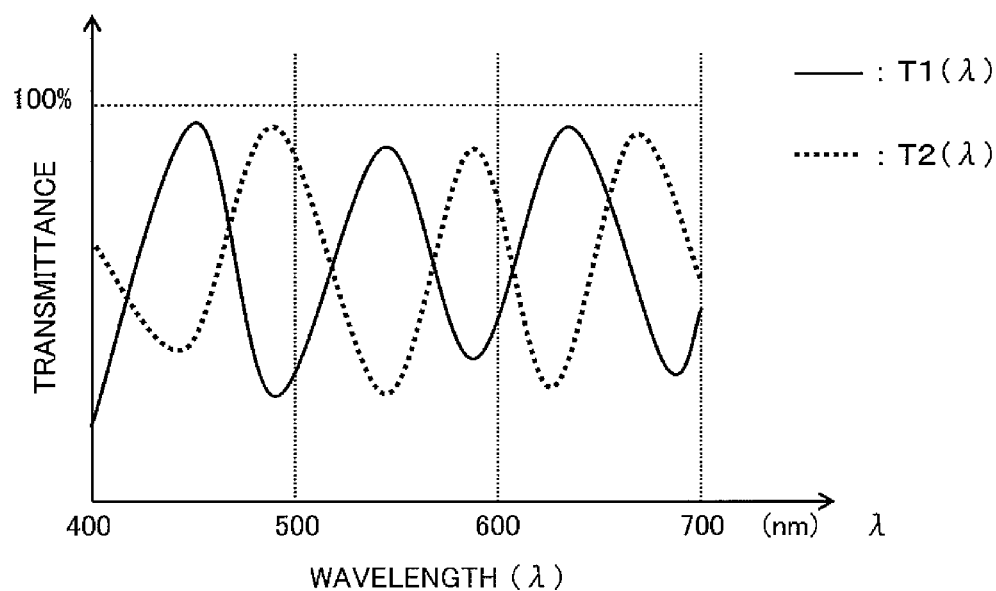
FIG. 2B A graph showing exemplary spectral transmittance characteristics of two transmitting filters.

FIG. 2A is a graph showing exemplary spectral transmittance characteristics of the light transmitting areas 1L and 1R. FIG. 2B is a graph showing exemplary spectral transmittance characteristics of the transmitting filters 40-1 and 40-2. In these graphs, the abscissa represents the wavelength and the ordinate represents the transmittance. As for the wavelengths on the axis of abscissas, only the range of approximately 400-700 nm, which is the wavelength range of visible radiation, is shown. In FIG. 2A, supposing the wavelength is $\lambda$, functions representing the transmittances of the light transmitting areas 1L and 1R are identified by $TL(\lambda)$ and $TR(\lambda)$, respectively. Likewise, in FIG. 2B, functions representing the transmittances of the transmitting filters 40-1 and 40-2 are identified by $T1(\lambda)$ and $T2(\lambda)$, respectively. In this description, the wavelength range of approximately 400-500 nm is defined herein to be a blue wavelength range, the wavelength range of approximately 500-600 nm a green wavelength range, and the wavelength range of approximately 600-700 nm a red wavelength range. However, as these definitions are adopted just for convenience sake, it may be determined arbitrarily which wavelength range represents which color.

As shown in FIG. 2A, $TL(\lambda)$ and $TR(\lambda)$ are different from each other and each have a local maximum value and a local minimum value within each of the red, green and blue wavelength ranges. Likewise, as shown in FIG. 2B, $T1(\lambda)$ and $T2(\lambda)$ are also different from each other and each have a local maximum value and a local minimum value within each of the red, green and blue wavelength ranges. As can be seen, the light transmitting areas 1L and 1R and the transmitting filters 40-1 and 40-2 for use in this embodiment of the present invention have different spectral transmittance characteristics from the color filters for use in the related art.

As long as $TL \neq TR$ and $T1 \neq T2$ are satisfied and as long as each of TL, TR, T1 and T2 has a local maximum value and a local minimum value within each of the red, green and blue wavelength ranges, the spectral transmittance characteristics do not have to be the ones shown in FIGS. 2A and 2B. However, in order to use the incoming light as efficiently as possible, TL, TR, T1 and T2 may be designed to be at least 50% on average with respect to any color component.

With such an arrangement adopted, multi-viewpoint images are generated based on the photoelectrically converted signals supplied from the two photosensitive cells 60-1 and 60-2, which will be identified herein by $W1s$ and $W2s$, respectively, in the following description. Meanwhile, the integrals of the transmittances of the light that has been transmitted through the light transmitting area 1L and then incident on the photosensitive cells 60-1 and 60-2 will be identified herein by W1Ls and W2Ls, respectively. In the same way, the integrals of the transmittances of the light that has been transmitted through the light transmitting area 1R and then incident on the photosensitive cells 60-1 and 60-2 will be identified herein by W1Rs and W2Rs, respectively. That is to say, W1Ls, W2Ls, W1Rs and W2Rs are given by the following Equations (1) through (4), respectively:

$$W1Ls = k\int TL(\lambda)T1(\lambda)d\lambda \quad (1)$$

$$W1Rs = k\int TR(\lambda)T1(\lambda)d\lambda \quad (2)$$

$$W2Ls = k\int TL(\lambda)T2(\lambda)d\lambda \quad (3)$$

$$W2Rs = k\int TR(\lambda)T2(\lambda)d\lambda \quad (4)$$

In this case, the incoming light is supposed to have an achromatic color. That is to say, the wavelength dependence of the intensity of the incoming light is supposed to be a negligible one and components of the light other than visible radiation are supposed to have been filtered out by an infrared cut filter, for example. Also, k is a factor of proportionality and the interval of integration is supposed to be the visible radiation wavelength range (e.g., from 400 nm through 700 nm).

Also, supposing that the light transmitting areas 1L and 1R and the transmitting filters 40-1 and 40-2 are completely transparent, signals representing the intensities of light rays that pass through the light transmitting areas 1L and 1R and are incident on a single photosensitive cell are identified by IMG(L) and IMG(R), respectively. In this case, as the spatial sizes of the photosensitive cells 60-1 and 60-2 are very small and as the photosensitive cells 60-1 and 60-2 are located close to each other, the intensities of the light rays incident on the photosensitive cells 60-1 and 60-2 are supposed to be substantially equal to each other. Then, IMG(L) and IMG(R) correspond to respective portions of an image when the subject is viewed from the positions of the light transmitting areas 1L and 1R, respectively. That is why if IMG(L) and IMG(R) are obtained for every pixel that is used to generate an image, multi-viewpoint images can be obtained.

If the factor of proportionality is neglected, the photoelectrically converted signals W1s and W2s can be represented by the following Equation (5) using a matrix:

$$\begin{pmatrix} W1s \\ W2s \end{pmatrix} = \begin{pmatrix} W1Ls & W1Rs \\ W2Ls & W2Rs \end{pmatrix} \begin{pmatrix} IMG(L) \\ IMG(R) \end{pmatrix} \quad (5)$$

As can be seen from this Equation (5), the signals IMG(L) and IMG(R) representing the multi-viewpoint images can be calculated by the following Equation (6) using the inverse matrix of the matrix represented by Equation (5):

$$\begin{pmatrix} IMG(L) \\ IMG(R) \end{pmatrix} = \begin{pmatrix} W1Ls & W1Rs \\ W2Ls & W2Rs \end{pmatrix}^{-1} \begin{pmatrix} W1s \\ W2s \end{pmatrix} \quad (6)$$

The respective elements of the matrix represented by this Equation (6) are known numbers to be derived from the spectral transmittance characteristics of the light transmitting areas 1L and 1R and the transmitting filters 40-1 and 40-2. That is why by making the calculation represented by this Equation (6), the image processing section can generate multi-viewpoint images. According to an embodiment of the present invention, as the light transmitting areas 1L and 1R and the transmitting filters 40-1 and 40-2, not ordinary color filters but filters with high transmittance such as the ones shown in FIGS. 2A and 2B are used. Consequently, the incoming light can be used more efficiently than in the related art.

Figure 3:
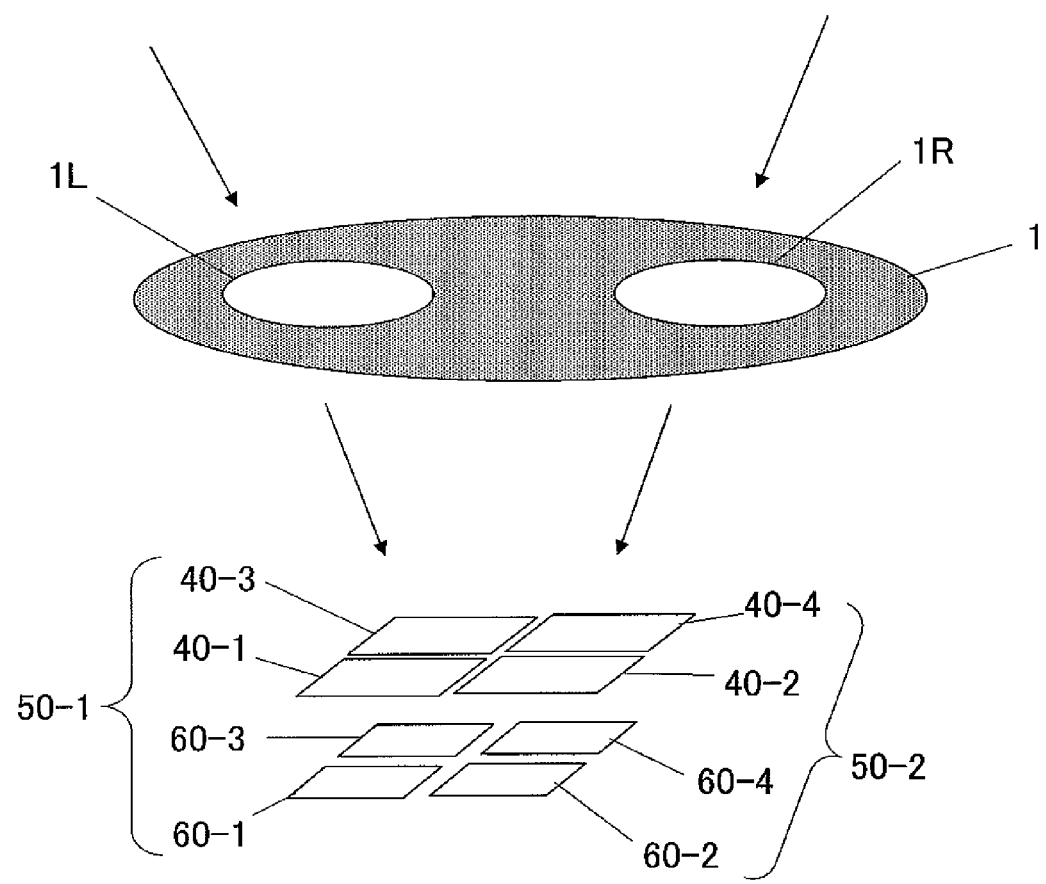
FIG. 3 Illustrates another example of a unit block consisting of a light transmitting section and an image sensor.

In the example described above, the transmitting filters 40-1 and 40-2 are each supposed to have the characteristic shown in FIG. 2B by themselves. However, this is only an example of the present invention and the spectral transmittance characteristic described above may also be realized by a combination of multiple transmitting filters. FIG. 3 schematically illustrates an example of such an alternative arrangement. In the arrangement shown in FIG. 3, one unit block includes four photosensitive cells 60-1, 60-2, 60-3 and 60-4 and four transmitting filters 40-1, 40-2, 40-3 and 40-4, which are arranged so as to face those photosensitive cells, respectively. In this example, a pixel including the photosensitive cell 60-1 and the transmitting filter 40-1 and a pixel including the photosensitive cell 60-3 and the transmitting filter 40-3 will be collectively referred to herein as a "first type of pixels". Likewise, a pixel including the photosensitive cell 60-2 and the transmitting filter 40-2 and a pixel including the photosensitive cell 60-4 and the transmitting filter 40-4 will be collectively referred to herein as a "second type of pixels".

And the characteristic of the transmitting filters 40-1 and 40-3 combined is supposed to agree with the characteristic represented by TL(λ) in FIG. 2B. This is realized if the characteristic of the transmitting filter 40-1 agrees with the short-wavelength half (from approximately 400 nm to approximately 550 nm) of T1(λ) shown in FIG. 2B and if the characteristic of the transmitting filter 40-3 agrees with the long-wavelength half (from approximately 550 nm to approximately 700 nm) of T1(λ) shown in FIG. 2B. Likewise, the characteristic of the transmitting filters 40-2 and 40-4 combined is supposed to agree with the characteristic represented by T2(λ) in FIG. 2B. In that case, the sum signal of the photoelectrically converted signals supplied from the photosensitive cells 60-1 and 60-3 agrees with the signal W1s and the sum signal of the photoelectrically converted signals supplied from the photosensitive cells 60-2 and 60-4 agrees with the signal W2s. Consequently, even in such a situation, multi-viewpoint images can also be obtained by making the calculations represented by Equation (6).

In the example shown in FIG. 3, each combination of two pixels is treated as a single type of pixels. However, a combination of three or more pixels may also be handled as a single type of pixels. Even so, by treating the sum of the respective spectral transmittances of multiple transmitting filters included in a single type of pixels as T1 or T2 described above and by adding multiple photoelectrically converted signals together, the same effects can also be achieved.

Hereinafter, specific embodiments of the present invention will be described with reference to FIGS. 4 through 12. In the following description, any element shown in multiple drawings and having substantially the same function will be identified by the same reference numeral.

Embodiment 1

Figure 4:
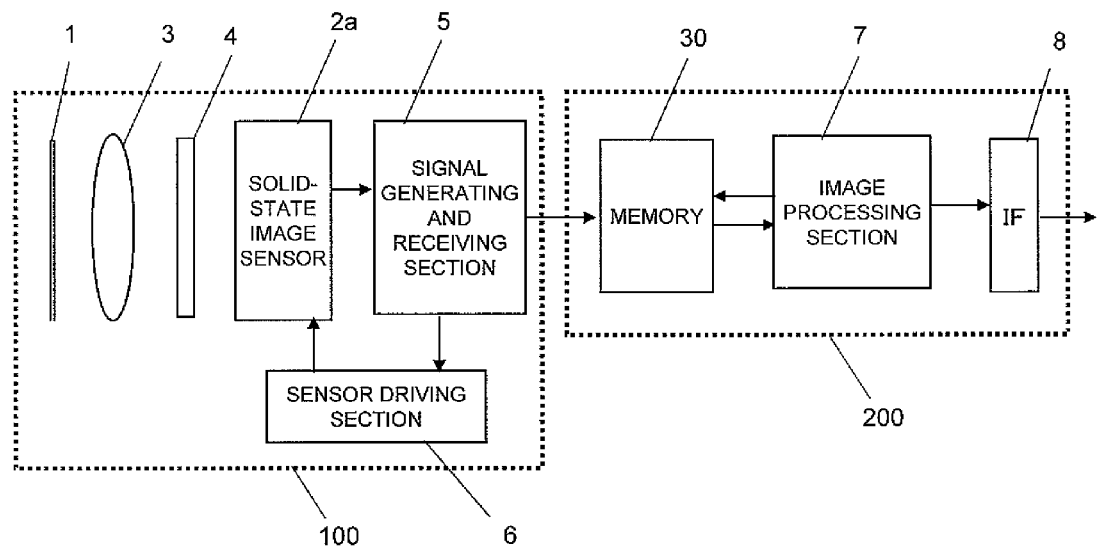
FIG. 4 A block diagram illustrating an overall configuration for an image capture device according to a first exemplary embodiment.

First of all, an image capture device as a first embodiment of the present invention will be described. FIG. 4 is a block diagram illustrating an overall configuration for an image capture device according to this first embodiment. The image capture device of this embodiment is a digital electronic camera and includes an image capturing section 100 and a signal processing section 200 that generates a signal representing an image (i.e., an image signal) based on the signal that has been generated by the image capturing section 100. This image capture device may have the function of generating a moving picture, not just a still picture.

The image capturing section 100 includes a color solid-state image sensor 2a (which will be simply referred to herein as an "image sensor") with a number of photosensitive cells that are arranged on its imaging area, a light-transmitting plate (light-transmitting section) 1, which has two transmitting areas, with mutually different spectral transmittances, an optical lens 3 for producing an image on the imaging area of the image sensor 1, and an infrared cut filter 4. The image capturing section 100 further includes a signal generating and receiving section 5, which not only generates a fundamental signal to drive the image sensor 2a but also receives the output signal of the image sensor 2a and sends it to the signal processing section 200, and a sensor driving section 6 for driving the image sensor 2a in accordance with the fundamental signal generated by the signal generating and receiving section 5. The image sensor 2a is typically a CCD or CMOS sensor, which may be fabricated by known semiconductor device processing technologies. The signal generating and receiving section 5 and the sensor driving section 30 may be implemented as an LSI such as a CCD driver.

The signal processing section 200 includes an image processing section 7 for generating multi-viewpoint images by processing the signal supplied from the image capturing section 100, a memory 30 for storing various kinds of data for use to generate the image signal, and an interface (I/F) section 8 for sending out the image signal thus generated and depth information to an external device. The image processing section 7 is suitably a combination of a hardware component such as a known digital signal processor (DSP) and a software program for use to perform image processing involving the image signal generation. The memory 30 may be a DRAM, for example. And the memory 30 not only stores the signal supplied from the image capturing section 100 but also temporarily retains the image data that has been generated by the image processing section 7 or compressed image data. These image data are then output to either a storage medium or a display section (neither is shown) by way of the interface section 8.

The image capture device of this embodiment actually further includes an electronic shutter, a viewfinder, a power supply (or battery), a flashlight and other known components. However, description thereof will be omitted herein because none of them are essential components that would make it difficult to understand how the present invention works unless they were described in detail. Also, this configuration is only an example. Thus, in this embodiment, additional components other than the light-transmitting plate 1, the image sensor 2a and the image processing section 7 may be implemented as an appropriate combination of known elements.

Hereinafter, the configuration of the image capturing section 100 will be described in further detail. In the following description, the xy coordinate system shown on the drawings will be used.

Figure 5:
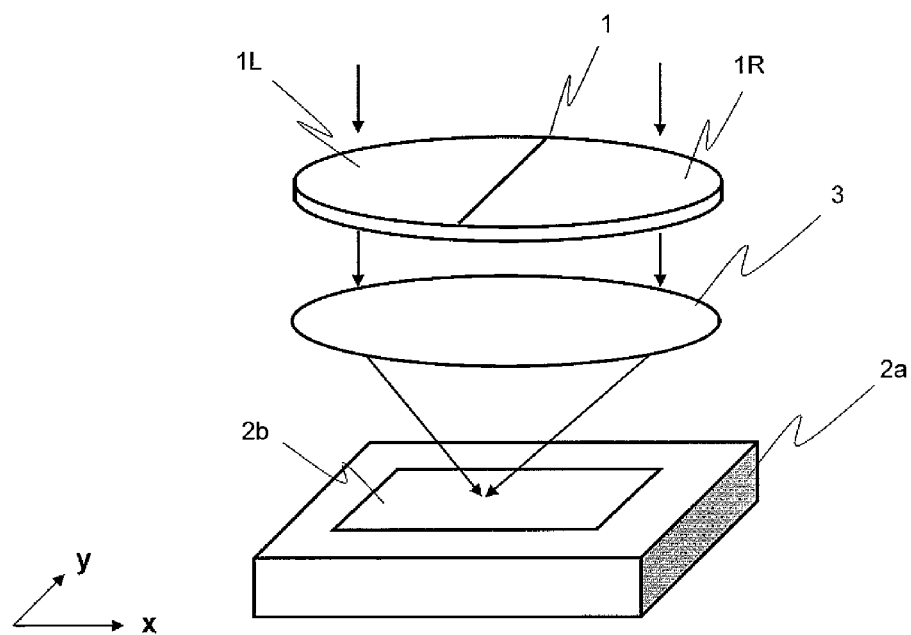
FIG. 5 A schematic representation generally illustrating the relative arrangement of a light-transmitting plate, an optical lens and an image sensor according to the first exemplary embodiment.

FIG. 5 schematically illustrates the relative arrangement of the light-transmitting plate 1, the lens 3 and the image sensor 2a in the image capturing section 100. It should be noted that illustration of the other elements is omitted in FIG. 5. The lens 3 may be a lens unit that is a group of lenses but is drawn in FIG. 5 as a single lens for the sake of simplicity. The light-transmitting plate 1 includes two light transmitting areas 1L and 1R, of which the spectral transmittance characteristics are different from each other, and transmits the incoming light at least partially. The lens 3 is a known lens and condenses the light that has been transmitted through the light-transmitting plate 1, thereby imaging the light on the imaging area 2a of the image sensor 2. It should be noted that the arrangement of the respective members shown in FIG. 5 is only an example. And the present invention is in no way limited to such a specific example. Alternatively, as long as an image can be produced on the imaging area 2b, the lens 3 may be arranged more distant from the image sensor 2a than the light-transmitting plate 1 is. Still alternatively, the lens 3 and the light-transmitting plate 1 may also be implemented as a single optical element.

Figure 6:
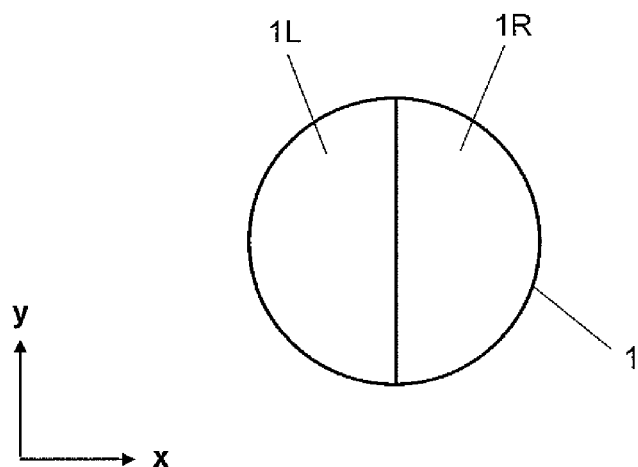
FIG. 6 A front view illustrating a light-transmitting plate according to the first exemplary embodiment.

FIG. 6 is a front view of the light-transmitting plate 1 of this embodiment. In this embodiment, the light-transmitting plate 1 has a circular shape just like the lens 3. However, the light-transmitting plate 1 may also have a quadrilateral shape or any other shape. The light-transmitting plate 1 is split into two light transmitting areas 1L and 1R which are located on the left- and right-hand sides, respectively, on the paper. These light transmitting areas 1L and 1R have mutually different spectral transmittance characteristics. Neither of these light transmitting areas 1L and 1R is completely transparent. But their spectral transmittance characteristics are designed so that the light transmitting areas 1L and 1R transmit at least partially a light ray falling within any of the red, green and blue wavelength ranges.

Figure 7:
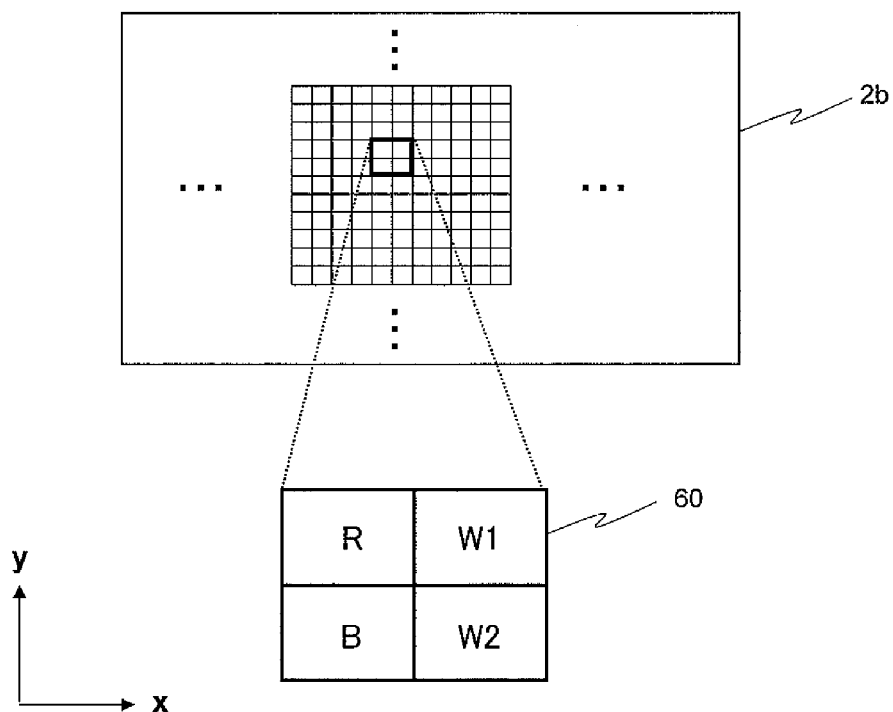
FIG. 7 A diagram illustrating the basic color scheme of an image sensor according to the first exemplary embodiment.

FIG. 7 illustrates some of a number photosensitive cells 60 which are arranged in columns and rows on the imaging area 2b of the image sensor 2a. Each of those photosensitive cells 60 typically includes a photodiode and performs photoelectric conversion on the incident light, thereby outputting a photoelectrically converted signal representing the quantity of the light received. A transmitting filter is arranged closer to the light source so as to face each of those photosensitive cells 60. As shown in FIG. 7, filters are arranged in this embodiment so that each unit consists of two rows by two columns of filters. Specifically, a red element (R) is arranged at the row 1, column 1 position, a blue element (B) is arranged at the row 2, column 1 position, a transparent element (W1) is arranged at the row 1, column 2 position, and another transparent element (W2) is arranged at the row 2, column 2 position. However, these transparent elements W1 and W2 have mutually different spectral transmittance characteristics. Neither of these transparent elements W1 and W2 is completely transparent. But the transparent elements are designed so as to transmit at least partially a light ray with any of the red, green and blue color components. In this embodiment, the transparent element W1 and the photosensitive cell that faces it corresponds to a first type of pixel, and the transparent element W2 and the photosensitive cell that faces it corresponds to a second type of pixel.

The light transmitting areas 1L and 1R of the light-transmitting plate 1 and the transparent elements W1 and W2 of the image sensor 1 may be made of a multilayer dielectric film. By using such a multilayer dielectric film, a transmitting filter, of which the transmittance becomes either local maximum or local minimum with respect to light with a predetermined wavelength, can be made. Meanwhile, the red (R) and blue (B) elements of the image sensor 1 may be made of a known pigment, for example.

Figure 8:
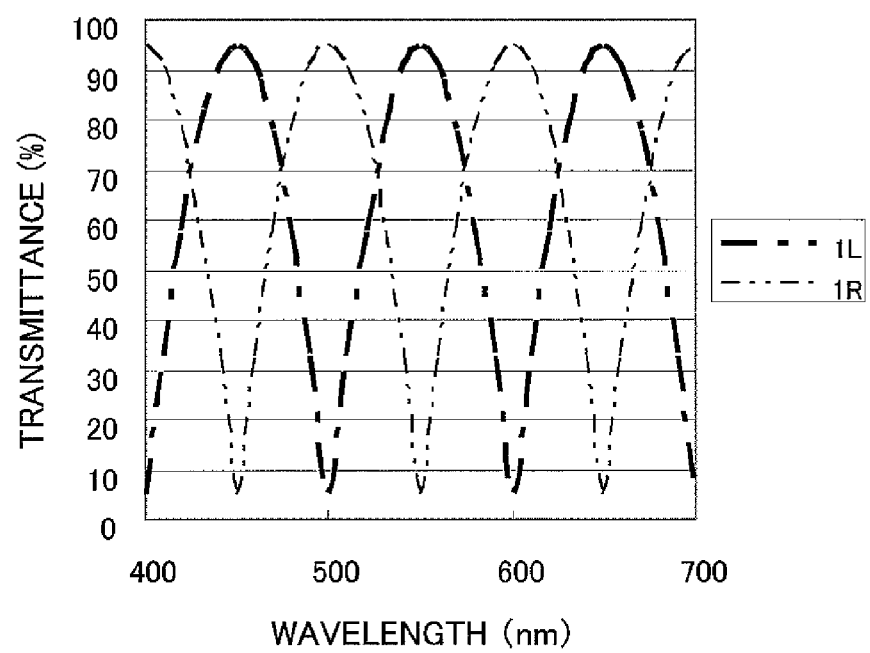
FIG. 8 A graph showing the spectral transmittance characteristics of a light-transmitting plate according to the first exemplary embodiment.

FIG. 8 is a graph showing the spectral transmittance characteristics of the light transmitting areas 1L and 1R of the light-transmitting plate 1 of this embodiment. As shown in FIG. 8, the spectral transmittance characteristic of the light transmitting area 1L is approximately the square of a trigonometric function Sin, and the spectral transmittance characteristic of the light transmitting area 1R is approximately the square of a trigonometric function Cos. That is to say, these two curves have similar waveforms but their phases are different from each other by 90 degrees. In this embodiment, the image capture device is designed so that the spectral transmittance characteristic of the transparent element W1 of the image sensor 2a is the same as the characteristic of the light transmitting area 1L and that the spectral transmittance characteristic of the transparent element W2 is the same as the characteristic of the light transmitting area 1R.

According to such an arrangement, the light that has entered this image capture device during an exposure process is transmitted through the light-transmitting plate 1, the lens 3, and the infrared cut filter 4, imaged on the imaging area 2b of the image sensor 2a, and then photoelectrically converted by the photosensitive cells 60. The photoelectrically converted signal that has been output from each photosensitive cell 60 is sent to the signal processing section 200 by way of the signal generating and receiving section 5. In the signal processing section 200, the image processing section 7 generates two multi-viewpoint images based on the signals supplied. According to this embodiment, color information is further superposed on these multi-viewpoint images, thereby generating color multi-viewpoint images.

Hereinafter, it will be described how the image capture device operates when a subject is captured through the light-transmitting plate 1. In the following description, as for respective pixel signals of the image sensor 2a, a signal representing the light that has been transmitted through the R element and then photoelectrically converted will be identified herein by $R_s$, a signal representing the light that has been transmitted through the B element and then photoelectrically converted by $B_s$, a signal representing the light that has been transmitted through the W1 element and then photoelectrically converted by $W1_s$, and a signal representing the light that has been transmitted through the W2 element and then photoelectrically converted by $W2_s$.

The color red and color blue components of the subject are transmitted through the light transmitting areas 1L and 1R of the light-transmitting plate 1, the lens, the infrared cut filter and the red and blue elements and then photoelectrically converted by the image sensor 2a, thereby generating $R_s$ and $B_s$ signals. The color white component of the subject (i.e., including every one of the color red, color green and color blue components) is also photoelectrically converted by the W1 and W2 elements of the image sensor but its signal level varies according to the magnitude of difference in the quantity of light incident between the light transmitting areas 1L and 1R. The reason is that the W1 and W2 elements not only have mutually different spectral transmittance characteristics but also have the same characteristics as the light transmitting areas 1L and 1R. In other words, the W1 element passes more light that has been transmitted through the light transmitting area 1L than the light that has been transmitted through the light transmitting area 1R, and the W2 element passes more light that has been transmitted through the light transmitting area 1R than the light that has been transmitted through the light transmitting area 1L. As a result, the W1 and W2 elements come to have mutually different signal levels.

Hereinafter, the photoelectrically converted signals W1s and W2s of this embodiment will be described. First of all, the signal W1Ls representing the light that passes through the light transmitting area 1L of the light-transmitting plate 1 and the W1 element and then is photoelectrically converted and the signal W1Rs representing the light that passes through the light transmitting area 1R and the W1 element and then is photoelectrically converted will be described. As described above, the transmittance of the light transmitting area 1L and the W1 element is proportional to the square of the trigonometric function Sin, the transmittance of the light transmitting area 1R and the W2 element is proportional to the square of the trigonometric function Cos and a photoelectric conversion efficiency including those factors of proportionality is supposed to be k.

The signal W1Ls is proportional to the integral of the respective transmittances of the light transmitting area 1L and the W1 element, and therefore, is represented by the following Equation (1). On the other hand, the signal W1Rs is proportional to the integral of the respective transmittances of the light transmitting area 1R and the W1 element, and therefore, is represented by the following Equation (2). In this case, the integration operation is performed on the entire visible radiation wavelength range.

$$W1Ls = k\!\int\! \sin^2[(\lambda-400)\pi/100]\sin^2[(\lambda-400)\pi/100]d\lambda \qquad (7)$$

$$W1Rs = k\!\int\! \cos^2[(\lambda-400)\pi/100]\sin^2[(\lambda-400)\pi/100]d\lambda \qquad (8)$$

If the interval of integration is set to be the visible radiation range of 400 nm to 700 nm and if the data is replaced so that the angle θ is 0 radians when the wavelength λ is 400 nm and is n radians when the wavelength λ is 500 nm by reference to FIG. 8 in order to get the calculations of Equations (7) and (8) done easily, then Equations (7) and (8) can be rewritten into the following Equations (9) and (10), respectively:

$$W1Ls = 6k\!\int_0^{\pi/2}\!\sin^2\theta \times^2\theta\, d\theta \qquad (9)$$

$$W1Rs = 6k\!\int_0^{\pi/2}\!\cos^2\theta \times^2\theta\, d\theta \qquad (10)$$

Equations (9) and (10) may be further modified into the following Equations (11) and (12), respectively:

$$\begin{aligned}W1Ls &= 6k\int_0^{\pi/2}\sin^4\theta\, d\theta \\ &= 6k\int_0^{\pi/2}\left(\frac{1-\cos 2\theta}{2}\right)^2 d\theta \\ &= 6k\int_0^{\pi/2}\frac{1-2\cos 2\theta+\cos^2 2\theta}{4}d\theta \\ &= \frac{3k}{2}\left(\frac{\pi}{2}+\int_0^{\pi/2}\frac{1+\cos 4\theta}{2}d\theta\right) \\ &= \frac{9k\pi}{8}\end{aligned} \qquad (11)$$

$$\begin{aligned}W1Rs &= 6k\int_0^{\pi/2}\frac{(\sin 2\theta)^2}{4}d\theta \\ &= 6k\int_0^{\pi/2}\frac{1-\cos 4\theta}{8}d\theta \\ &= \frac{3k\pi}{8}\end{aligned} \qquad (12)$$

In the same way, the signal W2Ls is proportional to the integral of the respective transmittances of the light transmitting area 1L and the W2 element, and therefore, is represented by the following Equation (13). On the other hand, the signal W2Rs is proportional to the integral of the respective transmittances of the light transmitting area 1R and the W2 element, and therefore, is represented by the following Equation (14):

$$W2Ls = k\!\int\! \cos^2[(\lambda-400)\pi/100]\sin^2[(\lambda-400)\pi/100]d\lambda \qquad (13)$$

$$W2Rs = k\!\int\! \cos^2[(\lambda-400)\pi/100]\cos^2[(\lambda-400)\pi/100]d\lambda \qquad (14)$$

In this case, since the right side of Equation (13) is equal to the right side of Equation (8), the same result of calculation is obtained by these two Equations (13) and (8). If the variable of integration λ is converted into θ as in the example described above with respect to Equation (14), the following Equation (15) is obtained:

$$W2Rs = 6k \int_0^{\pi/2} \cos^4\theta \, d\theta \qquad (15)$$

$$= 6k \int_0^{\pi/2} \left(\frac{1+\cos 2\theta}{2}\right)^2 d\theta$$

$$= 6k \int_0^{\pi/2} \frac{1 + 2\cos 2\theta + \cos^2 2\theta}{4} d\theta$$

$$= \frac{3k}{2}\left(\frac{\pi}{2} + \int_0^{\pi/2} \frac{1+\cos 4\theta}{2} d\theta\right)$$

$$= \frac{9k\pi}{8}$$

Consequently, W1Ls: W1Rs=3:1 and W2Ls: W2Rs:=1:3. This means that as for a signal representing the light ray that has been transmitted through the W1 element and then photoelectrically converted, its component that has been transmitted through the light transmitting area 1L and its component that has been transmitted through the light transmitting area 1R have mutually different signal levels, of which the ratio is 3:1. On the other hand, this means that as for a signal representing the light ray that has been transmitted through the W2 element and then photoelectrically converted, its component that has been transmitted through the light transmitting area 1L and its component that has been transmitted through the light transmitting area 1R have a signal ratio is 1:3.

If the images generated by the light beams that have come through the light transmitting areas 1L and 1R are identified by IMG(L) and IMG(R), respectively, then the relation between those images and the pixel signals W1s and W2s is represented by the following Equation (16):

$$\begin{pmatrix} W1s \\ W2s \end{pmatrix} = \begin{pmatrix} 1 & 1/3 \\ 1/3 & 1 \end{pmatrix} \begin{pmatrix} IMG(L) \\ IMG(R) \end{pmatrix} \qquad (16)$$

Furthermore, by multiplying both sides of this Equation (16) by the inverse matrix of the 2×2 matrix on the right side of Equation (16), the following Equation (17) is obtained:

$$\begin{pmatrix} IMG(L) \\ IMG(R) \end{pmatrix} = \frac{9}{8}\begin{pmatrix} 1 & -1/3 \\ -1/3 & 1 \end{pmatrix}\begin{pmatrix} W1s \\ W2s \end{pmatrix} \qquad (17)$$

As can be seen from the foregoing description, by using the light-transmitting plate 1 and the transparent elements W1 and W2 of this embodiment, the image processing section 7 can generate multi-viewpoint images. According to this embodiment, the transparent elements W1 and W2 have the property of transmitting light rays in all of the three primary colors of RGB, and therefore, signals representing the light rays that have been transmitted through those transparent elements W1 and W2 and then photoelectrically converted can be used as luminance signals.

Next, the color signal processing of this embodiment will be described. By adopting the configuration described above, pixel signals W1s, W2s, Rs and Bs are obtained from the image sensor 2a. The image processing section 7 processes W1s and W2s as luminance signals, and processes Rs and Bs as color signals. The respective pixel signals obtained by the image sensor 2a are passed to the image processing section 7, where calculation based on Equation (17) is performed on the pixel signals W1s and W2s, thereby generating two images with parallax (i.e., images represented by the signals IMG(L) and IMG(R)). However, these multi-viewpoint images have only luminance information and do not have any color information. That is why a luminance signal Yl is obtained by YL=W1s+W2s, color difference signals (Rs−YL) and (Bs−YL) are generated, and then signals obtained by turning these color difference signals into low frequency ones through a band-pass filter are superposed on the multi-viewpoint images obtained. After that, the image processing section 7 performs the processing of coloring the multi-viewpoint images in the following manner. If one of the colored multi-viewpoint images is identified by cIMG(L) and its RGB components are identified by cIMG(L)r, cIMG(L)g and cIMG(L)b, respectively, then cIMG(L)r, cIMG(L)g and cIMG(L)b are given by the following Equation (18):

$$\begin{pmatrix} cIMG(L)r \\ cIMG(L)g \\ cIMG(L)b \end{pmatrix} = \begin{pmatrix} M11 & M12 & M13 \\ M21 & M22 & M23 \\ M31 & M32 & M33 \end{pmatrix}\begin{pmatrix} IMG(L) \\ Rs-YL \\ Bs-YL \end{pmatrix} \qquad (18)$$

Equation (18) is used to transform the luminance signal and two color difference signals into RGB signals and the elements of its conversion matrix are identified by M11 through M33, respectively.

In the same way, if the other of the colored multi-viewpoint images is identified by cIMG(R) and its RGB components are identified by cIMG(R)r, cIMG(R)g and cIMG(R)b, respectively, then cIMG(R)r, cIMG(R)g and cIMG(R)b are given by the following Equation (19):

$$\begin{pmatrix} cIMG(R)r \\ cIMG(R)g \\ cIMG(R)b \end{pmatrix} = \begin{pmatrix} M11 & M12 & M13 \\ M21 & M22 & M23 \\ M31 & M32 & M33 \end{pmatrix}\begin{pmatrix} IMG(R) \\ Rs-YL \\ Bs-YL \end{pmatrix} \qquad (19)$$

The matrix elements M11 through M33 of Equations (18) and (19) are obtained in advance by simulation. By performing computations based on these Equations (18) and (19), the image processing section 7 transforms the luminance signal and two color difference signals into color signals cIMG(L)r, cIMG(L)g and cIMG(L)b.

In this embodiment, multi-viewpoint images are generated based on the luminance information and the same color signal is used in common for the two multi-viewpoint images when the coloring processing is performed after that. As far as a human being's visual sensation is concerned, he or she should be able to recognize colors less sensitively than luminance by nature. That is why even if color multi-viewpoint images are generated by such processing, no problem will arise as far as the human visual sensation is concerned.

As can be seen, according to this embodiment, a light-transmitting plate 1 with two light transmitting areas 1L and 1R that have mutually different spectral transmittance characteristics but that transmit any light ray falling within the visible radiation range and an image sensor 2a, in which two kinds of transparent elements W1 and W2 with the same optical properties as the light transmitting areas 1L and 1R are arranged, are used. Thus, multi-viewpoint images can be generated based on two pieces of luminance information. In addition, by using signals of pixels with R and B elements, the dmulti-viewpoint images can be colored. Particularly, according to this embodiment, the light-transmitting plate 1 has no opaque portion and can transmit a light ray in any of the three primary colors of RGB, and therefore, the incoming light can be used highly efficiently, which is beneficial.

Although red and blue elements R and B are used in the embodiment described above as two color elements in addition to transparent elements W1 and W2, those two color elements do not have to be red and blue elements. But the two color elements may have any combination of colors as long as the two colors are different. In addition, those color elements do not have to be arranged as shown in FIG. 7, either. Alternatively, an oblique arrangement, which is defined by rotating the arrangement shown in FIG. 7 45 degrees with respect to an axis that is defined parallel to the direction coming out of the paper on which FIG. 7 is drawn, may also be adopted. Furthermore, the spectral transmittance characteristics of the light-transmitting plate 1 and the transparent elements W1 and W2 of the image sensor 2a do not have to be approximate to the square of the trigonometric function shown in FIG. 8. But the spectral transmittance characteristics of W1 and W2 may be any other kind of characteristics as long as the optical transmittances vary periodically with the wavelength and as Tong as those variations have different phases. On top of that, the image capture device does not have to be designed so that the light transmitting area 1L and the transparent element W1 have the same spectral transmittance characteristic and that the light transmitting area 1R and the transparent element W2 also have the same spectral transmittance characteristic. Even if their spectral transmittance characteristics were all different but if the function forms of those spectral transmittance characteristics were known in advance, then the same effects should also be achieved through signal processing.

Embodiment 2

Hereinafter, a second embodiment of the present invention will be described. In this second embodiment, the image sensor 2a has a different basic color scheme from the first embodiment. But other than that, this embodiment is the same as the first embodiment. Thus, the following description of the second embodiment will be focused on those differences and their common features will not be described all over again to avoid redundancies.

Figure 10:
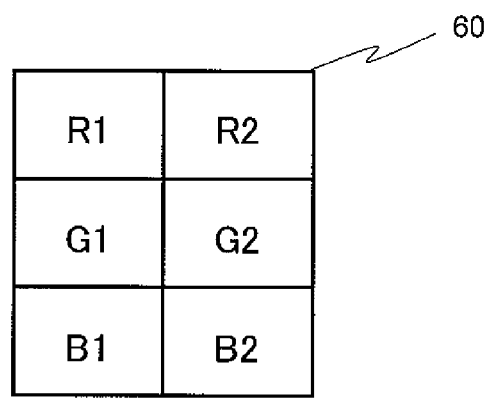
FIG. 10 A diagram illustrating the basic color scheme of an image sensor according to a third exemplary embodiment.

FIG. 10 illustrates the basic color scheme of a single unit block in the image sensor 2a of this embodiment. In the image sensor 2a of this embodiment, filters are arranged so that each unit consists of two rows by two columns of filters. Specifically, a red element (R) is arranged at the row 1, column 1 position, a blue element (B) is arranged at the row 2, column 1 position, a green element (G) is arranged at the row 1, column 2 position, and a transparent element (W2) is arranged at the row 2, column 2 position. The transparent element W2 is the same as the transparent element W2 of the first embodiment. In this embodiment, the spectral transmittance characteristics of the color B, G and R elements are the same as the characteristics of the light-transmitting plate 1L in the wavelength ranges of 400-500 nm, 500-600 nm, and 600-700 nm, respectively, in FIG. 8. That is to say, the sum of the respective spectral transmittance characteristics of the RGB elements is the same as the characteristic of the light transmitting area 1L shown in FIG. 8. On the other hand, the light-transmitting plate 1 is the same as what is used in the first embodiment. In this embodiment, combination of the red, blue and green elements R, B and G and three photosensitive cells that face them corresponds to the first type of pixels, and the transparent element W2 and a photosensitive cell that faces it corresponds to a second type of pixel.

Hereinafter, the signal processing of this embodiment will be described in comparison with the signal processing of the first embodiment. Specifically, the image sensor 2a of the first embodiment includes a W1 element and generates an image using its signal. In this embodiment, on the other hand, the sum of the signals supplied from the R, G and B elements, not the W1 element, is used as a W1s signal. As a result, the computation performed on the W1 and W2 elements becomes the same as that of the first embodiment. The images IMG(L) and IMG(R) produced by the light rays that have come through the light transmitting areas 1L and 1R are also generated by Equation (17) as in the first embodiment described above.

The multi-viewpoint images can also be colored by performing the same processing as in the first embodiment described above. First, by using the signals Rs, Bs, W1s and W2s, the image processing section 7 generates a luminance signal YL=W1s+W2s and two color difference signals (Rs−YL) and (Bs−YL). Next, these color difference signals are turned into low frequency ones by a band-pass filter and then those low-frequency signals are superposed on the two multi-viewpoint images. After that, the same processing is carried out based on Equations (18) and (19) as in the first embodiment, thereby generating color multi-viewpoint images.

As can be seen, according to this embodiment, by using an image sensor 2a in which R, G, B and W2 elements are arranged, color multi-viewpoint images can be generated. And if the sum of the respective spectral transmittance characteristics of the respective color R, G and B elements is the same as the characteristic of the light transmitting area 1L shown in FIG. 8, the effects of the first embodiment can also be achieved in this embodiment.

Figure 9:
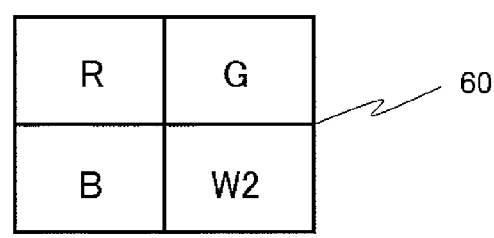
FIG. 9 A diagram illustrating the basic color scheme of an image sensor according to a second exemplary embodiment.

In this embodiment, the basic color scheme of the image sensor 2a is supposed to consist of R, G, B and W2 elements as shown in FIG. 9. However, the arrangement shown in FIG. 4 does not have to be used and there is no problem even if those elements are arranged differently.

Embodiment 3

Hereinafter, a third embodiment of the present invention will be described. In the image capture device of this embodiment, the two light transmitting areas 1L and 1R of the light-transmitting plate 1 have different spectral transmittance characteristics, and the image sensor 2a has a different filter arrangement, from those of the image capture device of the first embodiment. Thus, the following description of the third embodiment will be focused on those differences and their common features will not be described all over again to avoid redundancies.

In this embodiment, the basic color scheme of a single unit block of the image sensor 2a is supposed to consist of three rows by two columns of elements. FIG. 10 illustrates such a basic color scheme. As shown in FIG. 10, a red element (R1) is arranged at the row 1, column 1 position, a green element (G1) is arranged at the row 2, column 1 position, a blue element (B1) is arranged at the row 3, column 1 position, another red element (R2) is arranged at the row 1, column 2 position, another green element (G2) is arranged at the row 2, column 2 position, and another blue element (B2) is arranged at the row 3, column 2 position. The R1 and R2 elements both transmit mainly a light ray falling within the color red wavelength range but have mutually different spectral transmittance characteristics. Likewise, the G1 and G2 elements both transmit mainly a light ray falling within the color green wavelength range but have mutually different spectral transmittance characteristics. And the B1 and B2 elements both transmit mainly a light ray falling within the color blue wavelength range but have mutually different spectral transmittance characteristics.

Figure 11:
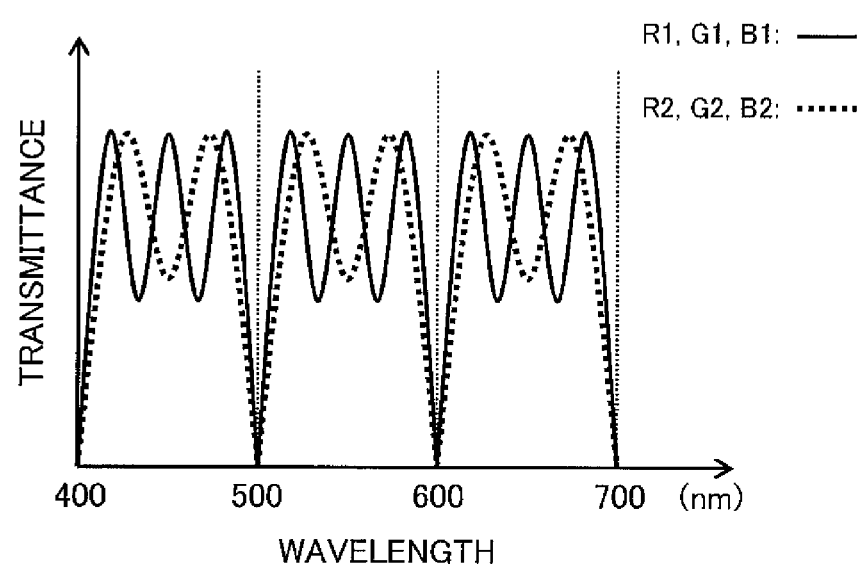
FIG. 11 A graph showing the spectral transmittance characteristics of color elements of an image sensor according to the third exemplary embodiment.

FIG. 11 is a graph showing the respective spectral transmittance characteristics of these elements. In FIG. 11, the solid curve represents the characteristic of R1 in the wavelength range of 400-500 nm, the characteristic of G1 in the wavelength range of 500-600 nm, and the characteristic of B1 in the wavelength range of 600-700 nm, respectively. In the same way, the dotted curve represents the characteristic of R2 in the wavelength range of 400-500 nm, the characteristic of G2 in the wavelength range of 500-600 nm, and the characteristic of B2 in the wavelength range of 600-700 nm, respectively. In this embodiment, the combination of these red, green and blue elements R1, G1 and B1 and the three photosensitive cells that face those elements corresponds to the first type of pixels, and the combination of these red, green and blue elements R2, G2 and B2 and the three photosensitive cells that face those elements corresponds to the second type of pixels.

Figure 12:
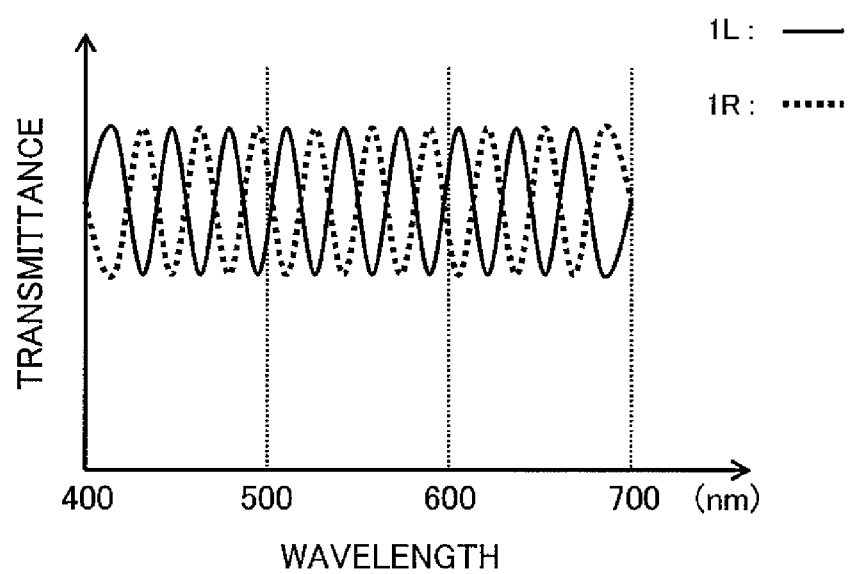
FIG. 12 A graph showing the spectral transmittance characteristics of a light-transmitting plate according to the third exemplary embodiment.
Figure 13:
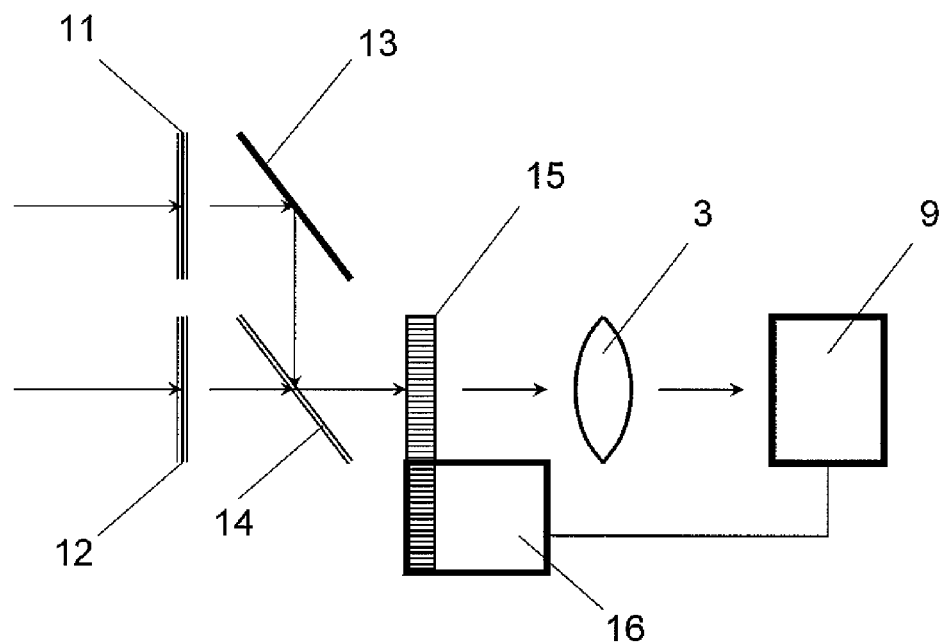
FIG. 13 A view illustrating the arrangement of an image capturing system according to Patent Document No. 1.
Figure 14:
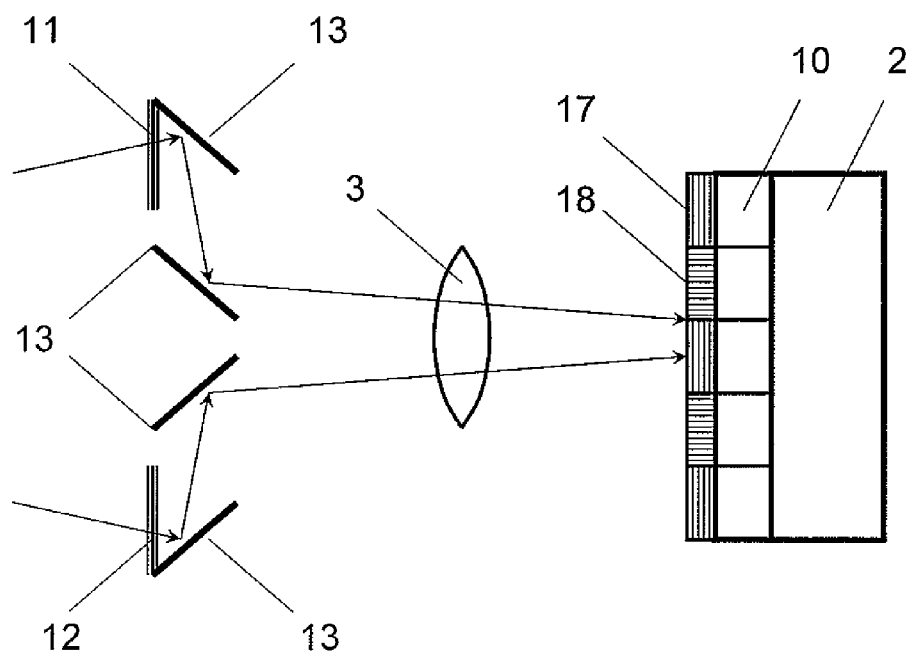
FIG. 14 A view illustrating the arrangement of an image capturing system according to Patent Document No. 2.
Figure 15:
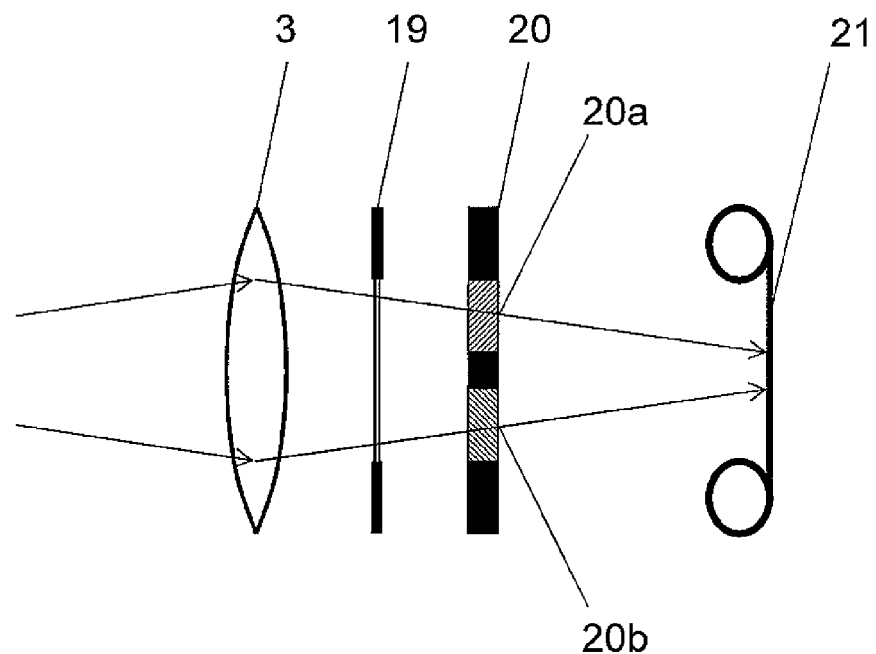
FIG. 15 A view illustrating the arrangement of an image capturing system according to Patent Document No. 4.
Figure 16:
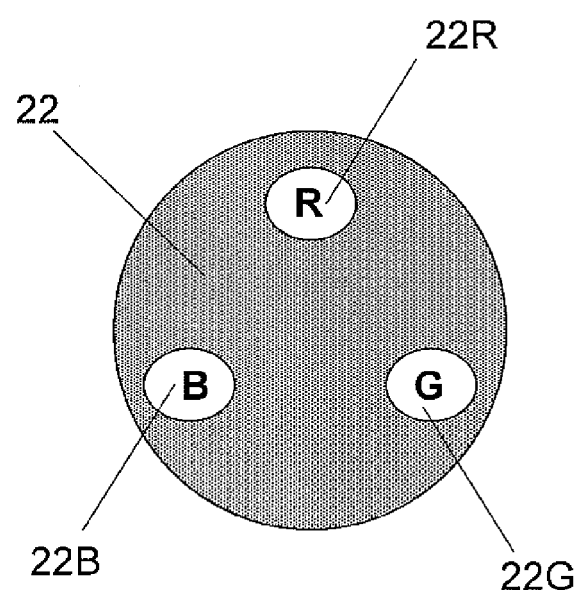
FIG. 16 A view illustrating the appearance of a light beam confining plate according to Patent Document No. 5.
Figure 17:
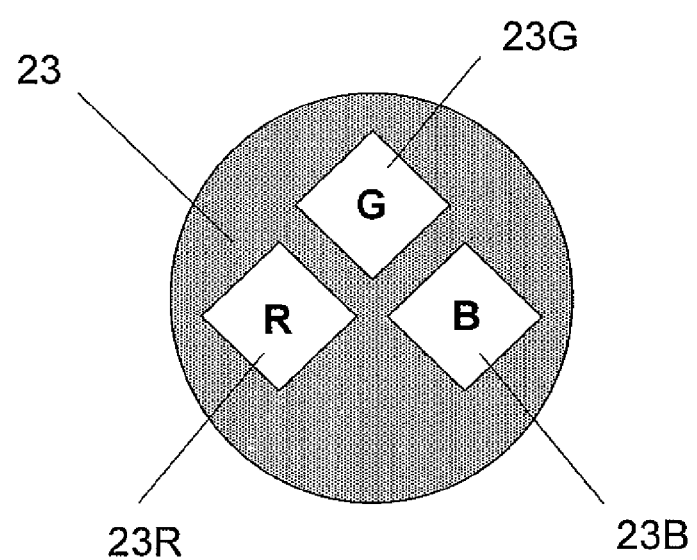
FIG. 17 A view illustrating the appearance of a light beam confining plate according to Patent Document No. 6.

The spectral transmittance characteristics of the light-transmitting plate 1 are also different from those of the first and second embodiments described above. FIG. 12 is a graph showing the spectral transmittance characteristics of the light-transmitting plate 1 of this embodiment. The curves representing the spectral transmittance characteristics of the light-transmitting plate 1 of this embodiment have more peaks (i.e., local maximum points) and more under-peaks (i.e., local minimum points) than the curves representing the spectral transmittance characteristics of the first and second embodiments.

Look at the respective phases of the spectral transmittance curves of respective color elements of the image sensor 2a and those of the spectral transmittance curves of respective light transmitting areas of the light-transmitting plate 1, and it can be seen that the characteristics of the R1, G1 and B1 elements have substantially the same phase as the characteristic of the light transmitting area 1L but almost the inverse phase to the characteristic of the light transmitting section 1R and that the characteristics of the R2, G2 and B2 elements have substantially the same phase as the characteristic of the light transmitting area 1R but have almost the inverse phase to the characteristic of the light transmitting section 1L. In the following description, the R1, G1 and B1 elements will be collectively referred to herein as a "G1 element", the R2, G2 and B2 elements will be collectively referred to herein as a "C2 element" and photoelectrically converted signals generated by converting the light rays that have been transmitted through those C1 and C2 elements will be identified herein by generalized signs C1s and C2s, respectively. According to the spectral transmittance characteristics described above, the light ray transmitted through the light transmitting area 1L and the C1 element has a larger quantity of light than the light ray transmitted through the light transmitting area 1R and the C1 element. In the same way, the light ray transmitted through the light transmitting area 1R and the C2 element has a larger quantity of light than the light ray transmitted through the light transmitting area 1L and the C2 element.

With such a configuration adopted, the relation between the signals C1s and C2s, the image IMG(L) generated by the light that has come through the light transmitting area 1L and the image IMG(R) generated by the light that has come through the light transmitting area 1R is represented by the following Equation (20):

$$\begin{pmatrix} C1s \\ C2s \end{pmatrix} = \begin{pmatrix} C11 & C12 \\ C21 & C22 \end{pmatrix} \begin{pmatrix} IMG(L) \\ IMG(R) \end{pmatrix} \quad (20)$$

These matrix elements C11 through C22 satisfy C11>C12 and C22>C21. Since this relation is satisfied, the inverse matrix of the matrix consisting of these elements C11 through C22 can always be obtained, and the images IMG(L) and IMG(R) can be represented by the signals C1s and C2s, respectively. Even though signals representing respective colors are given by C1s and C2s in this example, the computation of this Equation (20) is actually carried out based on the signals representing the respective colors of RGB. That is to say, the images IMG(L) and IMG(R) can be calculated based on those signals representing the respective colors of RGB.

As can be seen, according to this embodiment, an image sensor 2a with a set of R elements (R1, R2), a set of G elements (G1, G2) and a set of B elements (B1, B2), each set of which has mutually different spectral transmittance characteristics, and a light-transmitting plate 1 with two light transmitting areas 1L and 1R, which also have mutually different spectral transmittance characteristics, are used. The characteristics of the R1, G1 and B1 elements and the characteristic of the light transmitting area 1L have almost the same phase, so do the characteristics of the R2, G2 and B2 elements and the characteristic of the light transmitting area 1R. And the characteristics of the R1, G1 and B1 elements and the characteristic of the light transmitting area 1R have almost inverse phases, so do the characteristics of the R2, G2 and B2 elements and the characteristic of the light transmitting area 1L. By adopting such a configuration, parallax images IMG(L) and IMG(R) can be obtained based on the respective color signals. Furthermore, since the light-transmitting plate 1 transmits light rays representing the respective colors of RGB, the incoming light can be used more efficiently as well.

In the embodiment described above, the basic color scheme of the image sensor 2a is supposed to consist of three rows by two columns of elements. However, this is only an example and there is no problem at all even if the basic color scheme consists of two rows by three columns of elements. Also, the color elements to use do not have to be R, G and B elements but may be any other combination of color elements because as long as at least three different kinds of color elements are used, the signals can be converted into RGB signals by performing matrix computations during the signal processing. For example, the R, G and B elements may be replaced with the color filters in cyan (Cy), yellow (Ye) and magenta (Mg) as well.

In the embodiment described above, three different pairs of color filters are included in a single unit block. However, more than three pairs of color filters may be included as well. If the configuration of this embodiment is generalized, each of the first and second types of pixels may include first through $N^{th}$ (where N is an integer that is equal to or greater than three) photosensitive cells and first through $N^{th}$ transmitting filters which are arranged so as to face those photosensitive cells. In that case, in any type of pixels, the first through $N^{th}$ transmitting filters are configured to selectively transmit light rays with first through $N^{th}$ color components. And those transmitting filters are designed so that the spectral transmittance characteristic of the $i^{th}$ (where i is an integer that falls within the range of 1 through N) transmitting filter, which is included in the first type of pixels, with respect to the $i^{th}$ color component is different from the spectral transmittance characteristic of the $i^{th}$ transmitting filter, which is included in the second type of pixels, with respect to the $i^{th}$ color component. With such a configuration adopted, if the sum of the respective outputs of the N photosensitive cells is treated as a single output, the effects of this embodiment can also be achieved.

Other Embodiments

In the embodiments described above, the light-transmitting plate 1 is supposed to be split into two and the respective areas are supposed to have mutually different spectral transmittance characteristics. However, this is just an example of the present invention and such a configuration is not necessarily adopted. Alternatively, the light-transmitting plate 1 may be divided into three areas, two of which may have the same characteristics as the two light transmitting areas according to any of the embodiments described above and the other of which may be completely transparent. Even so, multi-viewpoint images can also be obtained. For example, if the basic color scheme of the image sensor 2a is as shown in FIG. 10 as in the third embodiment described above, then a transparent component W is added to the C11 through C22 elements of Equation (20). That is why the relation between the signals C1s, C2s and the images IMG(L) and IMG(R) is represented by the following Equation (21) in that case:

$$\begin{pmatrix} C1s \\ C2s \end{pmatrix} = \begin{pmatrix} C11+W & C12+W \\ C21+W & C22+W \end{pmatrix} \begin{pmatrix} IMG(L) \\ IMG(R) \end{pmatrix} \quad (21)$$

By multiplying this Equation (21) by the inverse one of the matrix of Equation (21) from the left to the right, signals IMG(L) and IMG(R), representing multi-viewpoint images, can be obtained. In this example, however, the ratios (C11: C12) and (C22: C21) with respect to the multi-viewpoint image change into (C11+W: C12+W) and (C22+W: C21+W), respectively. As a result, the magnitude of parallax obtained decreases compared to a situation where there is no transparent component W.

In the embodiments described above, the output signals of the image sensor 2a are supposed to be directly processed to generate signals with parallax. However, the output signals of the image sensor 2a may be once stored on a storage medium and then multi-viewpoint images may be generated while the data stored on the storage medium is being read out.

Furthermore, in the embodiments described above, the image processing section 7 generates color multi-viewpoint images. If no color information is needed, however, the image processing section 7 may also be configured to generate only monochrome multi-viewpoint images and perform no coloring processing. In that case, there is no need to use any color image sensor and the image sensor may have two transmitting filters such as the ones shown in FIG. 1.

In the embodiments described above, the image processing is supposed to be carried out by the image processing section that is built in the image capture device. However, such image processing may also be carried out by another device that is provided independently of that image capture device. For example, even if a signal that has been obtained by an image capture device including the image capturing section 100 of the embodiment described above is loaded into another device (image processor) to get a program defining the signal arithmetic processing described above executed by a computer built in the image processor, the effects of the embodiments described above can also be achieved.

INDUSTRIAL APPLICABILITY

A 3D image capture device according to an embodiment of the present invention can be used effectively in any camera that ever uses a solid-state image sensor. Examples of those cameras include consumer electronic cameras such as digital cameras and digital camcorders and solid-state surveillance cameras for industrial use.

REFERENCE SIGNS LIST 1 light-transmitting plate
1L, 1R light transmitting area
2 solid-state image sensor
2a color solid-state image sensor
2b imaging area
3 optical lens
4 infrared cut filter
5 signal generating and receiving section
6 sensor driving section
7 image processing section
8 image interface section
9 image capture device
10 pixel
11 0-degree-polarization polarizer
12 90-degree-polarization polarizer
13 reflective mirror
14 half mirror
15 circular polarization filter
16 driver that rotates polarization filter
17, 18 polarization filter
19 lens diaphragm
20, 22, 23 light beam confining plate
20a color filter that transmits red-based light ray
20b color filter that transmits blue-based light ray
21 photosensitive film
22R, 23R R ray transmitting area of light beam confining plate
22G, 23G G ray transmitting area of light beam confining plate
22B, 23B B ray transmitting area of light beam confining plate
30 memory
40 transmitting filter
50 pixel
60 photosensitive cell

The invention claimed is:

1. A 3D image capture device comprising:
a light transmitting section with first and second light transmitting areas;
an image sensor which is arranged to receive light that has been transmitted through the light transmitting section and which has an imaging area where a plurality of unit blocks, each including a first type of pixel and a second type of pixel, are arranged;
an imaging section which produces an image on the imaging area of the image sensor; and
an image processing section which generates multi-viewpoint images based on photoelectrically converted signals supplied from the first and second types of pixels,
wherein if functions representing the respective spectral transmittances of the first light transmitting area, the second light transmitting area, the first type of pixel, and the second type of pixel with respect to the wavelength λ of visible radiation are identified by TL(λ), TR(λ), T1(λ), and T2(λ), respectively,
TL(λ)≠TR(λ) and T1(λ)≠T2(λ) are satisfied, and
each of TL(λ), TR(λ), T1(λ) and T2(λ) has at least one local maximum value and at least one local minimum value within each of red, green and blue wavelength ranges.

2. The 3D image capture device of claim 1, wherein $TL(\lambda) = T1(\lambda)$ and $TR(\lambda) = T2(\lambda)$ are satisfied.

3. The 3D image capture device of claim 2, wherein $TL(\lambda)$, $TR(\lambda)$, $T1(\lambda)$ and $T2(\lambda)$ are periodic functions.

4. The 3D image capture device of claim 1, wherein the first type of pixel includes a first photosensitive cell and a first transmitting filter which is arranged so as to face the first photosensitive cell, and
wherein the second type of pixel includes a second photosensitive cell and a second transmitting filter which is arranged so as to face the second photosensitive cell, and
wherein $T1(\lambda)$ is a function representing the spectral transmittance of the first transmitting filter, and
wherein $T2(\lambda)$ is a function representing the spectral transmittance of the second transmitting filter.

5. The 3D image capture device of claim 4, wherein each said unit block further includes a third type of pixel and a fourth type of pixel, and
wherein the third type of pixel includes a third photosensitive cell and a third transmitting filter which is arranged to face the third photosensitive cell and which selectively transmits a light ray with a first color component, and
wherein the fourth type of pixel includes a fourth photosensitive cell and a fourth transmitting filter which is arranged to face the fourth photosensitive cell and which selectively transmits a light ray with a second color component, and
wherein the image processing section generates color information based on photoelectrically converted signals supplied from the third and fourth types of pixels.

6. The 3D image capture device of claim 1, wherein the first type of pixel includes a plurality of photosensitive cells and a plurality of transmitting filters, each of which is arranged so as to face an associated one of the photosensitive cells and which have mutually different spectral transmittance characteristics, and
wherein the second type of pixel includes a single photosensitive cell and a single transmitting filter which is arranged so as to face the single photosensitive cell, and
wherein $T1(\lambda)$ is a function representing the sum of the spectral transmittances of the transmitting filters included in the first type of pixel, and
wherein $T2(\lambda)$ is a function representing the spectral transmittance of the single transmitting filter included in the second type of pixel.

7. The 3D image capture device of claim 6, wherein the transmitting filters included in the first type of pixel are configured to selectively transmit light rays with mutually different color components.

8. The 3D image capture device of claim 7, wherein the number of photosensitive cells and the number of transmitting filters included in the first type of pixel are both three, and
wherein first, second and third ones of those three transmitting filters are configured to selectively transmit a light ray with a color red component, a light ray with a color green component, and a light ray with a color blue component, respectively.

9. The 3D image capture device of claim 1, wherein the first type of pixel includes a plurality of photosensitive cells and a plurality of transmitting filters, each of which is arranged so as to face an associated one of the photosensitive cells and which have mutually different spectral transmittance characteristics, and
wherein the second type of pixel includes a plurality of photosensitive cells and a plurality of transmitting filters, each of which is arranged so as to face an associated one of the photosensitive cells and which have mutually different spectral transmittance characteristics, and
wherein $T1(\lambda)$ is a function representing the sum of the spectral transmittances of the transmitting filters included in the first type of pixel, and
wherein $T2(\lambda)$ is a function representing the sum of the spectral transmittances of the transmitting filters included in the second type of pixel.

10. The 3D image capture device of claim 9, wherein each of the first and second types of pixels includes first through $N^{th}$ (where N is an integer that is equal to or greater than three) photosensitive cells and first through $N^{th}$ transmitting filters, each of which is arranged so as to face an associated one of the first through $N^{th}$ photosensitive cells, and
wherein the first through $N^{th}$ transmitting filters included in the first type of pixel are configured to selectively transmit light rays with first through $N^{th}$ color components, respectively, and
wherein the first through $N^{th}$ transmitting filters included in the second type of pixel are configured to selectively transmit light rays with the first through $N^{th}$ color components, respectively, and
wherein the spectral transmittance characteristic of an $i^{th}$ (where i is an integer that falls within the range of one through N) transmitting filter, included in the first type of pixel, with respect to the $i^{th}$ color component is different from that of an $i^{th}$ transmitting filter, included in the second type of pixel, with respect to the $i^{th}$ color component.

11. The 3D image capture device of claim 10, wherein N=3, and
wherein the first through third color components are red, green and blue components, respectively.

12. The 3D image capture device of claim 1, wherein the image processing section generates color multi-viewpoint images based on the signals supplied from the first and second types of pixels.

13. The 3D image capture device of claim 1, further comprising a storage section which stores an output signal of the image sensor,
wherein the image processing section generates the multi-viewpoint images based on the signal that is stored in the storage section.

14. An image sensor for use in the 3D image capture device of claim 1.

15. A light transmitting section for use in the 3D image capture device of claim 1.

16. An image processor which generates an image based on a signal supplied from a 3D image capture device, the device comprising: a light transmitting section with first and second light transmitting areas; an image sensor which is arranged to receive light that has been transmitted through the light transmitting section and which has an imaging area where a plurality of unit blocks, each including a first type of pixel and a second type of pixel, are arranged; and an imaging section which produces an image on the imaging area of the image sensor, wherein if functions representing the respective spectral transmittances of the first light transmitting area, the second light transmitting area, the first type of pixel, and the second type of pixel with respect to the wavelength $\lambda$ of visible radiation are identified by $TL(\lambda)$, $TR(\lambda)$, $T1(\lambda)$, and $T2(\lambda)$, respectively, $TL(\lambda) \neq TR(\lambda)$ and $T1(\lambda) \neq T2(\lambda)$ are satisfied, and each of $TL(\lambda)$, $TR(\lambda)$, $T1(\lambda)$ and $T2(\lambda)$ has at least one local maximum value and at least one local minimum value within each of red, green and blue wavelength ranges, wherein the image processor generates multi-viewpoint images based on photoelectrically converted signals supplied from the first and second types of pixels.

* * * * *